US010110363B2

(12) United States Patent
Chen et al.

(10) Patent No.: US 10,110,363 B2
(45) Date of Patent: Oct. 23, 2018

(54) LOW LATENCY IN TIME DIVISION DUPLEXING

(71) Applicant: QUALCOMM Incorporated, San Diego, CA (US)

(72) Inventors: Wanshi Chen, San Diego, CA (US); Durga Prasad Malladi, San Diego, CA (US); Peter Gaal, San Diego, CA (US); Yongbin Wei, La Jolla, CA (US); Hao Xu, San Diego, CA (US); Shimman Arvind Patel, San Diego, CA (US); Tao Luo, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 14/988,069

(22) Filed: Jan. 5, 2016

(65) Prior Publication Data
US 2016/0226650 A1 Aug. 4, 2016

Related U.S. Application Data

(60) Provisional application No. 62/109,206, filed on Jan. 29, 2015.

(51) Int. Cl.
H04L 5/14 (2006.01)
H04L 5/00 (2006.01)
H04W 72/04 (2009.01)

(52) U.S. Cl.
CPC ............... *H04L 5/14* (2013.01); *H04L 5/001* (2013.01); *H04L 5/0053* (2013.01); *H04L 5/1469* (2013.01); *H04W 72/0446* (2013.01)

(58) Field of Classification Search
CPC ....................................................... H04L 5/14
See application file for complete search history.

(56) References Cited

U.S. PATENT DOCUMENTS 7,756,087 B2 * 7/2010 Kim .................. H04W 72/1284
370/329
8,023,885 B2 * 9/2011 Proctor, Jr. .......... H04B 7/1555
455/11.1

(Continued)

FOREIGN PATENT DOCUMENTS

WO WO-2007025160 A2 3/2007

OTHER PUBLICATIONS

ISA/EPO, International Search Report and Written Opinion of the International Searching Authority, Int'l Appl. No. PCT/US2016/012367, dated Apr. 18, 2016, European Patent Office, Rijswijk, NL, 13 pgs.

(Continued)

Primary Examiner — Parth Patel
(74) Attorney, Agent, or Firm — Anthony R. Morris

(57) ABSTRACT

Methods, systems, and devices for wireless communication are described. A wireless system utilizing one or more time-division duplexing (TDD) configured carriers may utilize a dual transmission time interval (TTI) structure (e.g., at the subframe level and symbol-level). The symbol level TTIs may be referred to as low latency (LL) TTIs, and may be organized within LL subframes. A LL subframe may be a subframe that is scheduled for transmissions in one direction (e.g., uplink or downlink, according to a TDD configuration) and may include multiple LL symbols scheduled for both uplink (UL) and downlink (DL) transmissions. Guard periods may be scheduled between adjacent LL symbols that have opposite directions of transmission to enable user equipment (UEs) to transition from receiving mode to (Continued)

transmit mode (or vice versa). The LL subframes may be transparent to receiving devices that do not support LL operations.

28 Claims, 19 Drawing Sheets

(56) References Cited

U.S. PATENT DOCUMENTS

| | | | | |
|---|---|---|---|---|
| 8,498,234 | B2* | 7/2013 | Proctor | H04B 7/15507 370/279 |
| 9,629,066 | B2* | 4/2017 | Au | H04W 48/00 |
| 2002/0122465 | A1* | 9/2002 | Agee | H04B 1/69 375/141 |
| 2007/0140166 | A1* | 6/2007 | Eichinger | H04W 16/04 370/329 |
| 2008/0189970 | A1* | 8/2008 | Wang | H04W 36/0055 33/701 |
| 2009/0046627 | A1* | 2/2009 | Xu | H04W 72/1257 370/328 |
| 2010/0046402 | A1* | 2/2010 | Forck | H04L 1/0029 370/280 |
| 2010/0103902 | A1* | 4/2010 | Kim | H04L 5/0048 370/330 |
| 2010/0135273 | A1* | 6/2010 | Kim | H04B 1/69 370/344 |
| 2011/0038277 | A1* | 2/2011 | Hu | H04L 1/0026 370/252 |
| 2011/0164604 | A1* | 7/2011 | Hao | H04L 27/2626 370/345 |
| 2012/0135773 | A1* | 5/2012 | Shen | H04L 5/0048 455/513 |
| 2012/0207124 | A1* | 8/2012 | Liu | H04W 72/1231 370/329 |
| 2013/0094387 | A1* | 4/2013 | Susitaival | H04W 72/085 370/252 |
| 2013/0121316 | A1* | 5/2013 | Skov | H04L 5/0007 370/336 |
| 2013/0194980 | A1* | 8/2013 | Yin | H04L 1/1607 370/280 |
| 2014/0105077 | A1* | 4/2014 | Chen | H04L 1/1861 370/280 |
| 2014/0269451 | A1* | 9/2014 | Papasakellariou | H04B 7/2656 370/280 |
| 2014/0269452 | A1* | 9/2014 | Papasakellariou | H04B 7/2643 370/280 |
| 2014/0293893 | A1* | 10/2014 | Papasakellariou | H04W 72/04 370/329 |
| 2014/0328260 | A1* | 11/2014 | Papasakellariou | H04W 72/1289 370/329 |
| 2015/0085719 | A1* | 3/2015 | Yin | H04L 1/1896 370/280 |
| 2015/0146585 | A1* | 5/2015 | Rashid | H04L 5/0032 370/278 |
| 2015/0382284 | A1* | 12/2015 | Brismar | H04W 74/04 370/329 |
| 2016/0081107 | A1* | 3/2016 | Yang | H04L 5/001 370/280 |
| 2016/0192389 | A1* | 6/2016 | Li | H04W 56/0005 370/280 |
| 2016/0204927 | A1* | 7/2016 | Yi | H04B 7/2615 370/280 |
| 2016/0226650 | A1* | 8/2016 | Chen | H04L 5/14 |

OTHER PUBLICATIONS

Lähetkangas et al., "On the TDD Subframe Structure for Beyond 4G Radio Access Network," 2013 Future Network and Mobile Summit (FutureNetworkSummit), Lisboa, Jul. 3-5, 2013, 11 pgs., Institute of Electrical and Electronics Engineers.

Lu et al., "Uplink Control for Low Latency HARQ in TDD Carrier Aggregation," 2012 IEEE 75th Vehicular Technology Conference (VTC Spring), Yokohama, May 6-9, 2012, 5 pgs., ISBN 978-1-4673-0989-9, Institute of Electrical and Electronics Engineers.

* cited by examiner

LOW LATENCY IN TIME DIVISION DUPLEXING

CROSS REFERENCES

The present application for patent claims priority to U.S. Provisional Patent Application No. 62/109,206, entitled "ULTRA-LOW LATENCY IN TIME DIVISION DUPLEXING," filed Jan. 29, 2015, assigned to the assignee hereof, and expressly incorporated by reference herein.

BACKGROUND

The following relates generally to wireless communication, and more specifically to low latency (LL) with time division duplexing (TDD) carrier configurations.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

A wireless communication system may implement a feedback scheme to increase the reliability and robustness of transmissions between two devices. For instance, a receiving device may receive a signal from a transmitting device and send information regarding the condition of the received signal back to the transmitting device (e.g., an acknowledgement/negative acknowledgement (ACK/NACK)). The transmitting device may use the feedback information to determine the content of subsequent transmissions; for instance, the transmitting device may resend a signal that arrived at the receiving device with errors and it receives a NACK. The transmitting device may wait until it receives the ACK/NACK feedback before transmitting or retransmitting information. A longer transmission time interval (TTI) structure may result in higher latency between transmissions or retransmissions than may be realized in systems having shorter TTI structures. In some applications, such as voice calls, streaming media, or gaming, latency may decrease system performance and negatively impact user experience.

SUMMARY

Systems, methods, and apparatuses that support low latency (LL) with time-division duplexing (TDD) carrier configurations are described. A wireless system utilizing one or more time-division duplexing (TDD) configured carriers may employ a dual transmission time interval (TTI) structure (e.g., at the subframe level and symbol-level). The symbol level TTIs may be referred to as LL TTIs, and may be organized within LL subframes (e.g., subframes that are divided into multiple LL TTIs). Accordingly, a subframe scheduled for transmissions in one direction may include multiple LL symbols (e.g., symbol level TTIs) scheduled for both uplink (UL) and downlink (DL) transmissions; this type of subframe may be referred to as a LL subframe.

LL subframes may include guard periods, which may be scheduled between adjacent LL symbols with opposite directions to enable user equipment (UEs) to transition from receiving mode to transmit mode (or vice versa). In some cases, the guard periods may be a fraction a LL symbol length so that the sum of two guard periods adds up to one symbol period (e.g., instead of each guard period lasting for a symbol period). The LL subframes may be transparent to receiving devices that do not support LL operations. For example, a receiving device may not know that a subframe includes LL symbols in the opposite direction than is indicated by the scheduling information for the subframe. The wireless system may use LL subframes and LL symbols in a single-carrier scheme or in a carrier aggregation (CA) scheme. In a CA aggregation scheme, the wireless system may use half-duplexing such that symbols scheduled with the same direction on different component carriers (CCs) are aligned.

A method of wireless communication is described. The method may include identifying a first TTI of a TDD carrier, the first TTI having a first TTI duration and configured for transmission in a first direction, identifying a second TTI within the first TTI, the second TTI having a second TTI duration and configured for transmission in a second direction that is reverse from the first direction, and communicating in the second direction during the second TTI.

An apparatus for wireless communication is described. The apparatus may include means for identifying a first TTI of a TDD carrier, the first TTI having a first TTI duration and configured for transmission in a first direction, means for identifying a second TTI within the first TTI, the second TTI having a second TTI duration and configured for transmission in a second direction that is reverse from the first direction, and means for communicating in the second direction during the second TTI.

A further apparatus for wireless communication is described. The apparatus may include a processor, memory in electronic communication with the processor, and instructions stored in the memory. The instructions may be executable by the processor to identify a first TTI of a TDD carrier, the first TTI having a first TTI duration and configured for transmission in a first direction, identify a second TTI within the first TTI, the second TTI having a second TTI duration and configured for transmission in a second direction that is reverse from the first direction, and communicate in the second direction during the second TTI.

A non-transitory computer-readable medium storing code for wireless communication is described. The code may include instructions executable to identify a first TTI of a TDD carrier, the first TTI having a first TTI duration and configured for transmission in a first direction, identify a second TTI within the first TTI, the second TTI having a second TTI duration and configured for transmission in a second direction that is reverse from the first direction, and communicate in the second direction during the second TTI.

Some examples of the method, apparatuses, or non-transitory computer-readable medium described herein may further include processes, features, means, or instructions for identifying a third TTI within the first TTI, the third TTI having the second TTI duration and configured for transmission in the first direction. Additionally or alternatively, some examples may include processes, features, means, or instructions for identifying a first guard period between the second TTI and the third TTI, where the first guard period is within the first TTI.

Some examples of the method, apparatuses, or non-transitory computer-readable medium described herein may further include processes, features, means, or instructions for identifying a second guard period within the first TTI, and a sum of a duration of the first guard period and a duration of the second guard period is equal to the second TTI duration. Additionally or alternatively, in some examples identifying the first TTI includes receiving control signaling indicative of the first TTI.

In some examples of the method, apparatuses, or non-transitory computer-readable medium described herein, identifying the second TTI includes receiving control signaling indicative of at least one TTI. Additionally or alternatively, in some examples, the first TTI duration may be an LTE subframe and the second TTI duration may be one or more LTE symbol periods.

Some examples of the method, apparatuses, or non-transitory computer-readable medium described herein may further include processes, features, means, or instructions for identifying a special subframe having the first TTI duration and having a DL portion, an UL portion, and a guard period, where the guard period may include one or more TTIs configured for transmission in the first or second directions. Additionally or alternatively, in some examples, the first direction is an UL direction and the second direction is a DL direction, and communicating includes receiving a signal during the second TTI.

In some examples of the method, apparatuses, or non-transitory computer-readable medium described herein, the first direction is a DL direction and the second direction is an UL direction, and communicating includes transmitting a signal during the second TTI. Additionally or alternatively, in some examples, identifying the second TTI includes determining that the first TTI is not scheduled for a system information block 1 (SIB1) transmission.

In some examples of the method, apparatuses, or non-transitory computer-readable medium described herein, identifying the second TTI includes determining that the second TTI is not scheduled for a cell-specific reference signals (CRS) transmission. Additionally or alternatively, in some examples, identifying the second TTI includes determining that the second TTI is not scheduled in a resource block reserved for at least one of a physical broadcast channel, a synchronization channel, or a common search space.

In some examples of the method, apparatuses, or non-transitory computer-readable medium described herein, the TDD carrier is a CC of a plurality of CCs configured for carrier aggregation (CA) operation, the plurality of CCs comprising a second CC. Additionally or alternatively, in some examples the second CC is a TDD CC and the first TTI and the second TTI are both configured for half-duplex operation.

Some examples of the method, apparatuses, or non-transitory computer-readable medium described herein may further include processes, features, means, or instructions for refraining from communicating during a guard period within the first TTI, and communicating in the first direction on the second TDD CC during a third TTI having the second TTI duration that is aligned with the guard period. Additionally or alternatively, in some examples, the second CC is a TDD CC and the TDD carrier and the second CC have a complementary transmission configuration for a frame, such that TTIs may be configured for transmission in the first direction in substantially every subframe of the frame, and at least one TTI configured for transmission in the second direction.

In some examples of the method, apparatuses, or non-transitory computer-readable medium described herein, the complementary transmission configuration includes an offset frame structure for the TDD carrier and the second CC. Additionally or alternatively, in some examples, the plurality of CCs configured for CA operation also includes a third CC having a frame with TTIs of the first TTI duration each configured for transmission in one of the first or second directions.

In some examples of the method, apparatuses, or non-transitory computer-readable medium described herein, the second TTI is configured for transmission in a third direction on the TDD carrier in a first time period, and is configured for transmission on the second CC in the third direction in a second time period.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
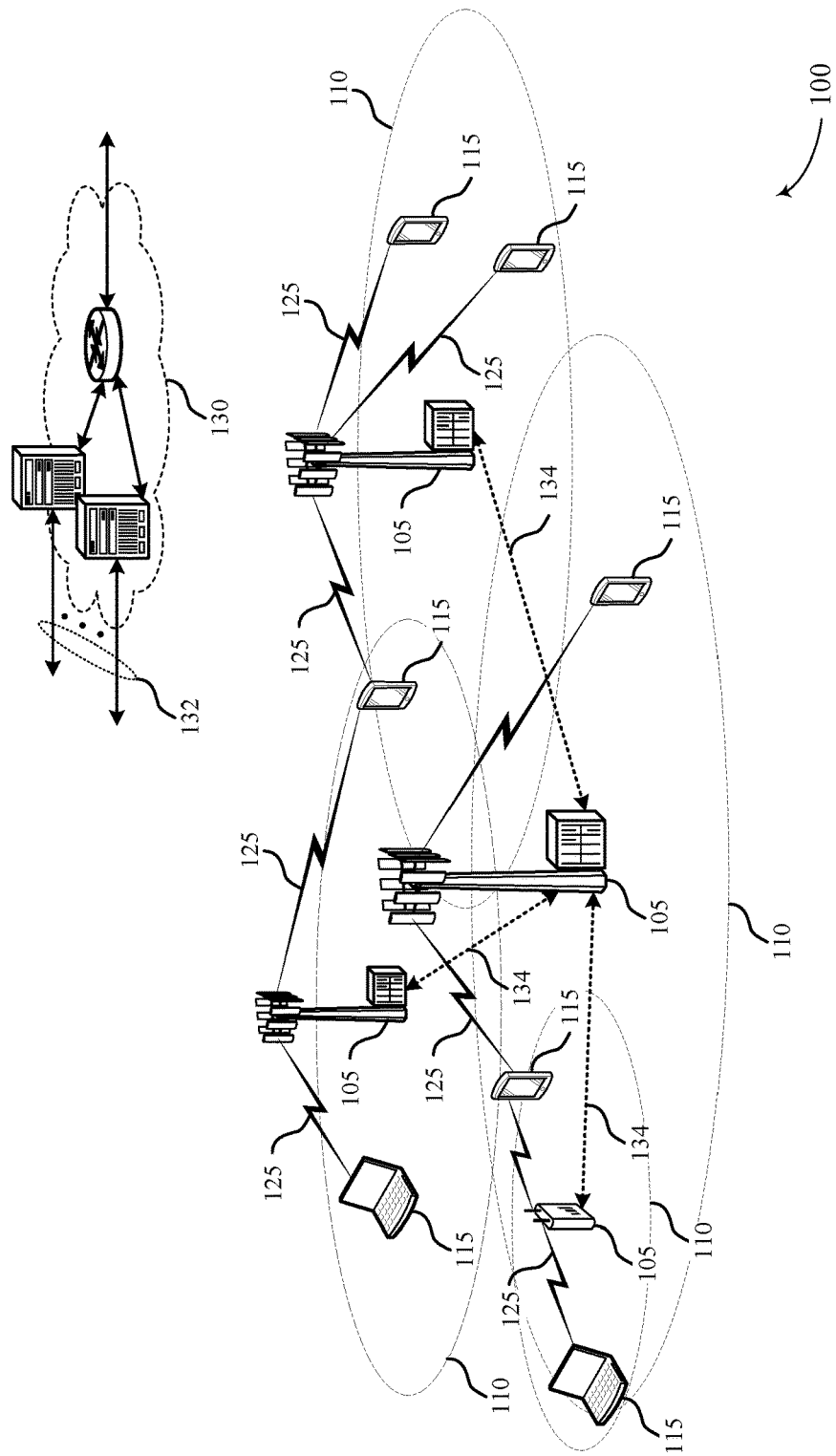
FIG. 1 illustrates an example of a wireless communications system that supports LL in TDD in accordance with various aspects of the present disclosure.

In a frequency-division duplexing (FDD) configuration there may be paired downlink (DL) and (UL) spectrum. In this setting, low latency (LL) operations may be readily supported, provided that either the DL or UL link is available. A time-division duplexing (TDD) structure may, however, be susceptible to an interruption in LL service if the TDD carrier contains subframes that tend to support transmissions in a single direction (e.g., UL or DL). The present disclosure describes various tools and techniques for achieving the LL in a system employing various TDD configurations.

A wireless system may employ a dual transmission time interval (TTI) structure on a TDD configured carrier or on multiple TDD carriers. Symbol level TTIs may be referred to as LL TTIs and may be organized within particular subframes of TDD frame. These subframes may be referred to as LL subframes and may be scheduled for transmissions in one direction (e.g., UL or DL) and they may include multiple LL symbols scheduled for both UL and DL transmissions. Guard periods may be scheduled between adjacent LL symbols within a LL subframe where the LL symbols have opposite directions of transmission. These guard periods may to enable UEs to transition from receiving mode to transmit mode (or vice versa). The LL subframes may be transparent to receiving devices that do not support LL operations such that some devices may operate in the system with recognizing that a subframe includes LL symbols in the opposite direction than is indicated by the scheduling information for the subframe.

Because LL subframes may contain both DL and UL LL symbols, transmission and reception by a same device is possible within either a DL or UL subframe. Moreover, because the numerology of such LL symbols may be consistent with numerology for non-LL system operation, LL-capable UEs can utilize the LL symbols while non-LL UEs can readily ignore the symbols. As described herein, a system may employ may leverage LTE numerology (e.g., timing, TTI structure, etc.) to minimize implementation effort and foster backwards compatibility. For instance, in certain systems supporting LL may include a 15 kHz tone spacing and a CP duration of 71 μs. This approach may thus provide for integration of both LL UEs and non-LL or legacy UEs (e.g., UEs operating according to earlier versions of an LTE standard).

As mentioned above, and as further described herein, an LL TTI structure may significantly reduce latency in a wireless system. For example, as compared to an LTE system without a LL TTI structure, latency may be reduced from approximately 4 ms to approximately 300 μs. This represents more than an order of magnitude reduction in latency. Because a TTI for each LL period may be a single symbol period, a potential latency reduction of 12× or 14× (for extended CP and normal CP, respectively) may be realized. In some cases, up to 8 HARQ processes can be accommodated. In other cases, more than 8 HARQ processes may be supported.

In the case of single component carrier, a non-LL UE can select a fixed, pre-determined TDD configuration, while a UE that supports LL can determine the actual LL configuration. The LL configuration can be determined on a per-symbol basis according to actual LL scheduling. The first TDD configuration can, for instance, be indicated in System Information Block 1 (SIB1); or the configuration may be indicated in Downlink Control Information (DCI) as part of Enhanced Interference Mitigation and Traffic Adaptation (eIMTA) operation. In some example, DL subframes can be used for DL LL, while UL subframes can be used for UL LL. Additionally, in some cases, some DL subframes can also be dynamically used for UL LL. In addition, some of the UL subframes can be dynamically used for LL services.

A UE may determine the symbol or symbols that are designated for DL or UL LL in a subframe by explicit indication (e.g., via control channel) or by implicit determination (e.g., based on scheduling decision by a base station, based on other information in a subframe, or the like).

In some cases, it may be preferable to avoid UL LL in certain symbols of DL subframe. For instance, CRS symbols that may also be used by some non-LL UEs for measurement, channel/interference estimation, and other functions may be transmitted with LL subframes. It may therefore be appropriate to exclude the TTIs that include CRS symbols from UL LL operation. Although, LL UL could be enabled in non-CRS REs in CRS symbols. In some cases, it may be preferable to avoid UL LL in certain DL subframes. For example subframes {5/25/45/ . . . /(5+n·20)} may be used for SIB1 transmissions, and some examples may disallow UL LL in these subframes. Alternatively, RBs carrying SIB1 could be excluded from UL LL. Likewise it may be preferable to avoid UL LL for some RBs of certain DL subframes. For example, the center six RBs in certain symbols may be used for primary synchronization signals (PSS), secondary synchronization signals (SSS), or physical broadcast channel (PBCH). These RBs, along with some guard band, in the symbols may be excluded from UL LL. However, LL UEs may recognize such subframes or symbols, and may accordingly infer information about or indicative of designated DL or UL LL symbols.

In the case of intra-band carrier aggregation (CA), half-duplex operation among CCs may leveraged to handle two or more CCs with different subframe directions, which may provide for LL operation on multiple TDD CCs. Half-duplex operation may involve either transmitting or receiving in any time interval. Half-duplex operation can be done on a per symbol basis. For example, configured CCs could be DL LL for one symbol, and could be UL LL for another symbol. This type of configuration can be backward compatible in a transparent manner.

For inter-band CA (or CA in a group as part of dual-connectivity), more flexible management may be possible through complementary DL/UL configurations. In particular, two or more CCs in CA/DC can have different configurations such that DL LL is enabled in one or more DL-heavy CCs while UL LL is enabled in CCs with more UL subframes. As discussed herein, special subframes can use both GP and UpPTS for UL LL. LL can also be enabled in other CCs as well.

Due to different TDD DL/UL configurations, two or more CCs may be located in different frequency bands in order to minimize inter-CC interference from simultaneous transmission and reception. For example, in one frequency band, DL LL could be enabled; in another frequency band UL LL could be enabled.

In some cases, it may be possible to set complementary frame offsets in the different CCs to ensure essentially contiguous LL. For example, in a two CC configuration the offset may be synchronized so that the two CCs carry both a DL and a UL LL symbol between the two them during each subframe (even as the individual CCs switch between UL and DL symbols). Additional TDD configurations are also possible, including DL-only or UL-only configurations for some CCs as well as dynamic changes to subframe configuration.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, user equipment (UEs) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. RRC signaling may be used to configure various UEs 115 for communication via one or several TDD carriers, for example. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. Some UEs 115 may be LL UEs 115, which may be capable of recognizing and communicating via LL TTIs.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described herein. Each modulated signal may be sent on a different sub-carrier and may carry control information (e.g., reference signals, control channels, etc.), overhead information, user data, etc. The communication links 125 may transmit bidirectional communications using frequency-division duplex (FDD) (e.g., using paired spectrum resources) or time-division duplex (TDD) operation (e.g., using unpaired spectrum resources), as described below. Some communication links 125 may include a TDD carrier or TDD carriers configured with LL subframes.

LTE systems may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by an SFN ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be for the UE. In some cases, the subframe may be the smallest scheduling unit, also known as a transmission time interval (TTI). In other cases, certain TTIs may be shorter than a subframe or may be dynamically selected (e.g., in short TTI bursts or in selected component carriers using short TTIs). For instance, some subframes may be LL subframes that include LL TTIs, which may be scheduled for UL LL or DL LL for LL UEs 115.

Wireless communications system 100 may support operation on multiple cells or carriers, a feature which may be referred to as carrier aggregation (CA) or multi-carrier operation. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, a UE 115 may be served by cells from two or more base stations 105 that are connected by a non-ideal backhaul 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers. In both carrier aggregation a dual-connectivity, CCs serving a UE 115 may be TDD component carriers, which may have complementary configurations as described below.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. The PSS and SSS may be useful for both LL UEs 115 and non-LL UEs 115. The system 100 may therefore schedule LL operations to avoid disrupting PSS and SSS transmissions.

After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, SRS, and cell barring.

After completing initial cell synchronization, a UE 115 may decode the MIB, SIB1, and SIB2 prior to accessing the network. The MIB may be transmitted on PBCH and may utilize the first 4 orthogonal frequency division multiple access (OFDMA) symbols of the second slot of the first subframe of each radio frame. It may use the middle 6 resource block (RBs) (72 subcarriers) in the frequency domain. The MIB carries a few important pieces of information for UE initial access, including: DL channel bandwidth in term of RBs, PHICH configuration (duration and resource assignment), and SFN. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 may include access information, including cell identity information, and it may indicate whether a UE is allowed to camp on a cell of a base station 105. SIB1 also includes cell selection information (or cell selection parameters). Additionally, SIB1 may include scheduling information for other SIBs. The information contained in PBCH and system information, such as SIB1, may be read by and useful for both LL UEs 115 and non-LL UEs 115. Accordingly, the system 100 may schedule LL operations to avoid disrupting such transmissions.

A base station may use a control channel such as physical downlink control channel (PDCCH) to carries downlink control information (DCI). DCI may be transmitted using control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. In some examples, DCI may also include LL scheduling information.

PDCCH can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The common CCE region of PDCCH may be transmitted may be utilized by both LL and non-LL UEs 115, so scheduling of LL TTIs may be done accordingly.

As mentioned above, HARQ may be a method of ensuring that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). LL operation may decrease latency of HARQ operations, as compared to HARQ operations in a non-LL scenario.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. As with system information, CRS may be read by both LL UEs 115 and non-LL UEs 115. Accordingly, the system 100 may schedule LL operations to avoid disrupting CRS transmissions.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame.

For LTE/LTE-A, seven different TDD DL/UL configurations are defined that provide between 40% and 90% DL subframes as illustrated in Table 1.

TABLE 1

TDD Configurations

| TDD Config. | DL to UL Switch-point Periodicity (ms) | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

In some cases, a wireless communications system may utilize one or more enhanced component carriers (eCCs), (e.g., in conjunction with an enhanced carrier aggregation (eCA) scheme). An eCC may be characterized by one or more features including: flexible bandwidth, dynamic TTIs, LL subframes, LL TTIs, and modified control channel configuration. In some cases, an eCC may be associated with a carrier aggregation configuration or a dual connectivity configuration (i.e., when multiple serving cells have a sub-optimal backhaul link). An eCC may also be configured for use in unlicensed spectrum or shared spectrum (where more than one operator is licensed to use the spectrum).

Thus, system 100 may utilize a dual TTI structure (e.g., at the subframe level and symbol-level) and may support LL operation with a TDD carrier or carriers. A LL subframe scheduled for transmissions in one direction may include multiple LL symbols scheduled for both UL and DL transmissions. Guard periods may be scheduled between adjacent LL symbols with opposite directions to enable UEs 115 to transition from receiving mode to transmit or receive mode. The LL subframes may be transparent to receiving devices that do not support LL operations; for example, a receiving device may not know that a subframe includes LL symbols in the opposite direction than is indicated by the scheduling information for the subframe. The LL subframes may support communications based on LL, based on subframe-level TTI, or both.

Figure 2:
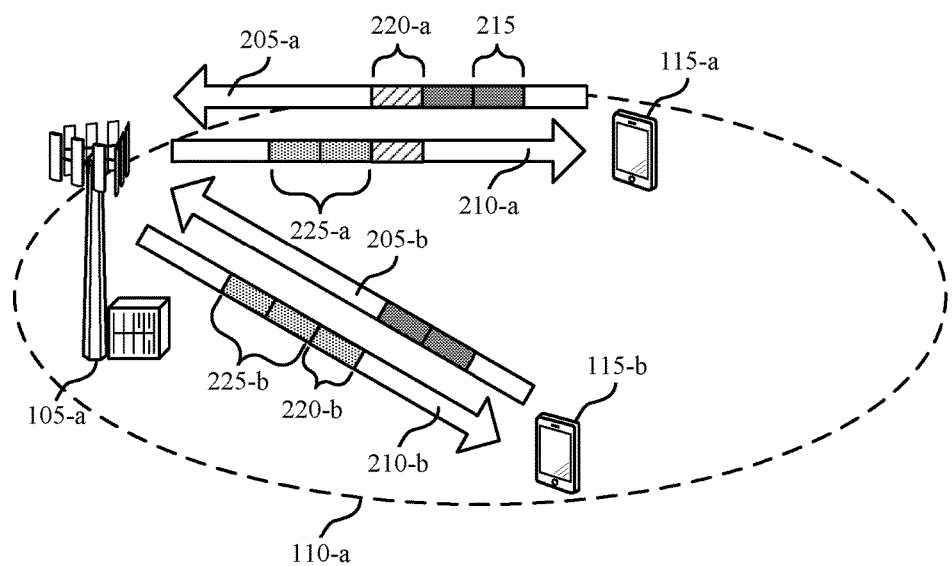
FIG. 2 illustrates an example of a wireless communications system that supports LL in TDD in accordance with various aspects of the present disclosure.

FIG. 2 illustrates an example of a wireless communications system 200 that supports LL in TDD in accordance with various aspects of the present disclosure. Wireless communications system 200 may include a UEs 115-a and 115-b, which may be examples of a UEs 115 described above with reference to FIG. 1. Wireless communications system 200 may also include a base station 105-a, which may be an example of a base station 105 described above with reference to FIG. 1.

Base station 105-a may communicate with any UE 115 within coverage area 110-a. For example, base station 105-a may exchange data and control with UE 115-a and UE 115-b via downlink 210-a and uplink 205-a and downlink 210-b and uplink 205-b, respectively. Information may be conveyed over uplink 205 and downlink 210 using radio resources such as time (e.g., during subframe 215) and frequency (e.g., over carriers). System 200 may implement TDD such that during a given subframe 215 a UE 115 is scheduled to either receive information or transmit information. In some cases, system 200 may utilize LL subframes 220 during which an LL capable UE 115 may both transmit and receive information.

The LL subframes 220 may convey data in both the uplink direction and the downlink direction. For instance, the LL subframes 220 may include a number of symbols that are scheduled for downlink and a number of symbols which are scheduled for uplink. A UE 115 may switch between a transmission setup and a reception setup in order to send and receive information during TTIs as scheduled by a base station 105. Accordingly, a base station 105 may schedule empty TTIs between changes in communication direction (e.g., between an uplink TTI and a downlink TTI), which may provide a UE time to reconfigure. The empty TTIs may be at the subframe level or the symbol level and may be referred to as guard periods. In some cases, CA may be used for communication between a base station 105 and a UE 115. Accordingly, half-duplexing may be used to distribute resources for downlink 210 and uplink 205.

In the present example, base station 105-a may transmit information to UE 115-a and UE 115-b during downlink subframes 225-a. Base station 105-a may also transmit information to UE 115-b during corresponding subframes 225-b. Base station 105-a may schedule some symbols of LL subframe 220 for uplink and some symbols for downlink. However, in some cases, there may be UEs 115 within coverage area 110-a which support different protocols. For example, UE 115-a may support LL subframes 220 and UE 115-b may not support LL subframes 220. In such cases, UE 115-b may treat LL subframes 220 as an uplink subframe 225. For instance, UE 115-a may recognize the LL subframe 220 as a LL subframe and behave accordingly (e.g., UE 115-a may transmit and receive during symbols within LL subframe 220 as scheduled by base station 105-a). In contrast, UE 115-b may not recognize the LL subframe 220 as a LL subframe and may treat the LL subframe 220 as a downlink subframe. In other words, UE 115-b may ignore the symbols within LL subframe 220 that are associated with low latency scheduling.

In some cases, system 200 may employ CA for communications between base station 105-a and UEs 115-a, 115-b. For example, base station 105-a may use two or more component carriers to convey control and data to a UE 115. The component carriers may include LL TTIs, such as LL subframes 220. System 200 may implement half-duplexing to accommodate both uplink 205 and downlink 210 transmissions on component carriers such that a UE 115 is either receiving or transmitting during a given subframe. For example, a base station 105 may schedule the subframes associated with different component carrier frames according to the same configuration. Additionally, the LL symbol configuration of the subframes associated with the component carriers may be the same.

System 200 may implement a HARQ scheme which may provide feedback regarding the status of data sent during a TTI. For example, a HARQ process may be performed at a symbol-level. Base station 105-*a* may, for instance, transmit data during a LL subframe 310 and receive an ACK/NACK associated with the data during the same LL subframe 310. Utilizing an LL TTI structure—e.g., increasing the granularity of direction-based resource breakdown—may decrease latency, with respect to other TTI structures, for communications between base station 105-*a* and UE 115-*a*.

Figure 3A:
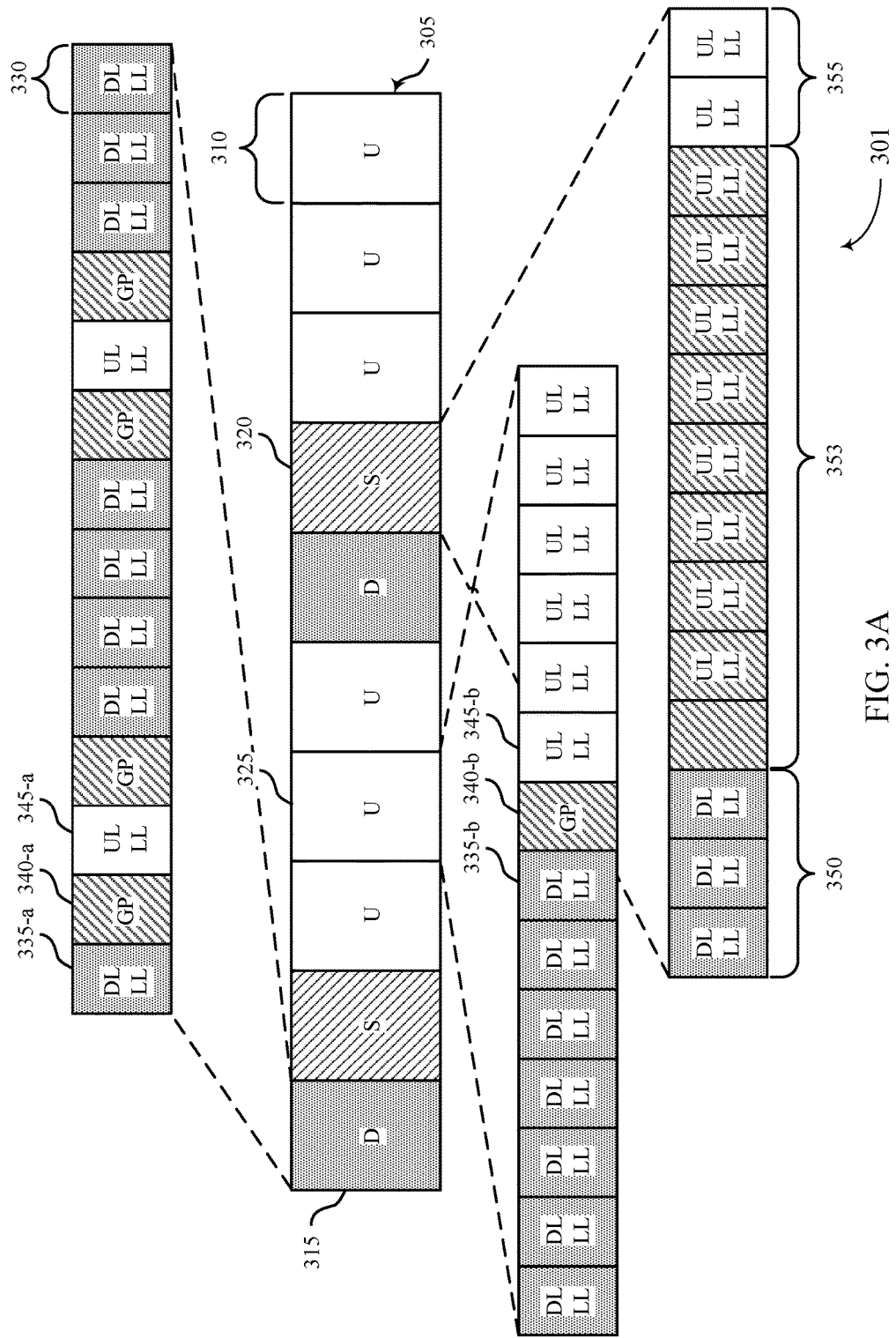
FIG. 3A illustrates an example of an expanded view of a frame configuration for LL in TDD in accordance with various aspects of the present disclosure.

FIG. 3A illustrates an example of an expanded view of a frame configuration 301 for LL in TDD in accordance with various aspects of the present disclosure. Frame configuration 301 may include a frame 305, which may include a number of LL subframes 310 scheduled for downlink or uplink. LL subframes 310 may be example of LL subframes 220 as described with reference to FIG. 2. Frame 305 may be used in a FDD or TDD system.

Frame 305 may include a number of LL downlink subframes 315 and LL uplink subframes 325. In some cases, frame 305 may include both LL subframes and non-LL subframes. The distribution of LL downlink subframes 315 and LL uplink subframes 325 may be determined by a base station 105 according to predefined uplink/downlink TDD configurations (e.g., according to a configuration identified in Table 1). For example, frame 305 may be an example of TDD Configuration 0, a configuration in which the first and seventh LL subframes 310 for downlink and the third, fourth, fifth, eighth, ninth, and tenth LL subframes 310 for uplink. Between the LL downlink subframes 315 and the LL uplink frames 325, the base station may not schedule any information. Such scheduling gaps may allow a UE 115 to transition from a downlink setup to an uplink setup. Thus, frame 305 may include special subframes 320 which act as guard periods for occasions when communication direction changes (e.g., from downlink to uplink).

LL subframes 310 may be partitioned into smaller segments—e.g., larger TTIs, such as slots, may include smaller TTIs, such as symbols. For example, LL subframes 310 may include a number of LL symbols 330. The LL symbols 330 may be scheduled to convey downlink data (e.g., downlink symbols) or uplink data (e.g., uplink symbols). In some low-latency configurations, a base station 105 may schedule the LL symbols 330 of a LL subframe 310 according to the same or different direction as the LL subframe 310. For example, LL downlink subframe 315 may include both LL downlink symbols 335-*a* and LL uplink symbols 345-*a*, and LL uplink subframe 325 may include both LL downlink symbols 335-*b* and LL uplink symbols 345-*b*. Because both LL uplink symbols 345 and LL downlink symbols 335 are present in a LL subframe 310, a HARQ process may be performed during LL subframe 310. For example, a base station 105 may transmit data during downlink symbol 335-*a* and receive an ACK/NACK for the data conveyed during LL downlink symbol 335-*a* in LL uplink symbol 345-*a*. Thus, a HARQ process may be performed at the symbol-level (e.g., within a LL subframe 310).

A base station 105 may schedule portions of some TTIs (e.g., LL subframes 310 or LL symbols 330) for neither uplink nor downlink communications. The gap in scheduled communications may provide time for a UE 115 to change from a reception state to a transmission state, or vice versa. The gap may also help mitigate interference to reception from transmissions from another node. For instance, a base station 105 may refrain from scheduling communications during some symbols in a special subframe 320. Thus, during special subframe 320, a UE 115 may reconfigure communication states—e.g., the UE 115 may change from a reception configuration to a transmission configuration, etc. In some cases, these set of symbols in a special subframe 320 may be termed a guard period. According to the present disclosure, a base station 105 may schedule a number of LL symbols 330 for communication within a special subframe 320 while refraining from scheduling some other LL symbols 330. Thus, a fraction (e.g., one LL symbol 330 or a fraction of one LL symbol 330) of a special subframe 320 may be used for switching time. In other words, instead of the switching frequency at the subframe-level, symbol-level switching frequency may be implemented for a UE 115. For instance, a downlink partial transmission scheme (DwPTS) portion 350 may be defined for the first several symbols of special subframe 320, and the symbols of DwPTS portions 350 may be scheduled for DL LL. Likewise, an uplink partial transmission scheme (UpPTS) portion 355 may be defined for the last several symbols of the special subframe 320; the symbols of the UpPTS portion 355 may be scheduled for UL LL. Additionally, as illustrated in the example depicted in FIG. 3A, all but one symbol of a guard period 353 of special subframe 320 may also be scheduled for LL (e.g., UL LL). As another example, although not shown, at least one symbol of a guard period 353 of special subframe 320 may also be scheduled for DL LL, while at least one symbol of a guard period 353 of special subframe 320 may also be scheduled for UL LL. One or more switching periods may be implemented within special subframe 320, where each switching period may be placed between a transition from DL LL or UL LL, or vice versa. The duration of each switching period may be in units of symbols or in a fraction of symbol. The duration of each switching period may or may not be the same.

Different UEs 115 may process a special subframe 320 according to different manners. Some UEs 115 may treat a special subframe 320 as a black box—e.g., ignoring information associated with LL symbols 330 within the special subframe 320—while other UEs 115 may treat the special subframe as a transparent box—e.g., recognizing and processing information associated with LL symbols 330 within special subframe 320. In other words, some UEs 115 may not recognize LL symbols 330 which are scheduled to convey information within special subframe 320.

In some cases, a base station 105 may schedule gaps between communication direction changes at the symbol-level (e.g., the gaps may be within a LL subframe 310). For example, a base station 105 may schedule guard periods 340-*a* and 340-*b*, which may allow a UE 115 to change configurations. The guard periods 340 maybe the same length as the LL symbols 330, or they may be fractions of the length of the LL symbols 330. Additionally, the fractional-length guard periods 340 may have the same or different lengths. In some examples, a number of alternating DL or UL LL periods may be scheduled within a subframe without sacrificing extra time to GP symbols. This may be accomplished by using fractional symbol lengths for the GP symbols, for instance. The durations of the fractional symbols may differ in length but may have a sum equal to a symbol period. This scheme can also be advantageous if different cyclic prefixes (CPs) are used for DL and UL. For instance cases, the sum of two guard periods 340 within a LL subframe 310 may be equal to the length of a LL symbol 330 within the LL subframe 310—e.g., two guard periods 340 may provide a UE 115 switching time while using the length of a single LL symbol 330 or a fraction of a single LL symbol 330 especially when UL LL has a different CP than DL LL. Accordingly, more LL symbols 330 may be available for communication.

The distribution of the LL downlink symbols 335 and the LL uplink symbols 345 may be determined by a base station 105 and may be different for different LL subframes 310. Additionally, the configuration of a LL downlink subframe 315 may be different from the configuration of a LL uplink subframe 325. Some LL subframes 310 and LL symbols 330 may not be suitable for flexible scheduling. For example, a LL subframe 310 may be allocated to carry control information associated with system information blocks (SIBs) which may be used by a UE for system acquisition. As an example, SIB1 is scheduled to transmit in subframes 5, 25, 45, 65, etc., and consequently, these subframes may not be suitable for flexible scheduling. Additionally, some symbols may be used by a UE 115 for channel estimation, synchronization (e.g., primary synchronization signal PSS or secondary synchronization signal (SSS)), system information broadcast (e.g., primary broadcast channel or PBCH), time/frequency tracking, radio resource management, radio link monitoring, interference estimation, etc. (e.g., cell-specific reference signals (CRS)). In such cases, the base station 105 may refrain from scheduling the unsuitable TTIs (e.g., LL subframes 310 or LL symbols 330) according to low latency. In a similar fashion, a base station may refrain from scheduling resources according to the low latency configuration described herein at a resource block-level or resource element-level. As an example, the center 6 resource blocks in certain subframes may be used to carry PSS, SSS, and/or PBCH, and hence may not be suitable for flexible scheduling. Thus, a base station 105 may schedule radio resources according to various low latency configurations, and may do so to avoid adversely impacting transmissions of synchronization signals, reference signals, or system information for non-LL UEs 115.

A base station 105 may use control signaling to support different TTI configurations. For instance, a base station 105 may signal to a UE 115 which LL symbols 330 are for downlink and which LL symbols 330 are for uplink via explicit indication (e.g., via a control channel such as physical downlink control channel (PDCCH)). In some examples, a base station 105 may utilize a low latency control channel (e.g., uPDCCH) for such scheduling. In another example, a UE 115 may use implicit determination (e.g., based on the scheduling decision by the base station 105) to determine the data direction of each LL symbol 330.

Figure 3B:
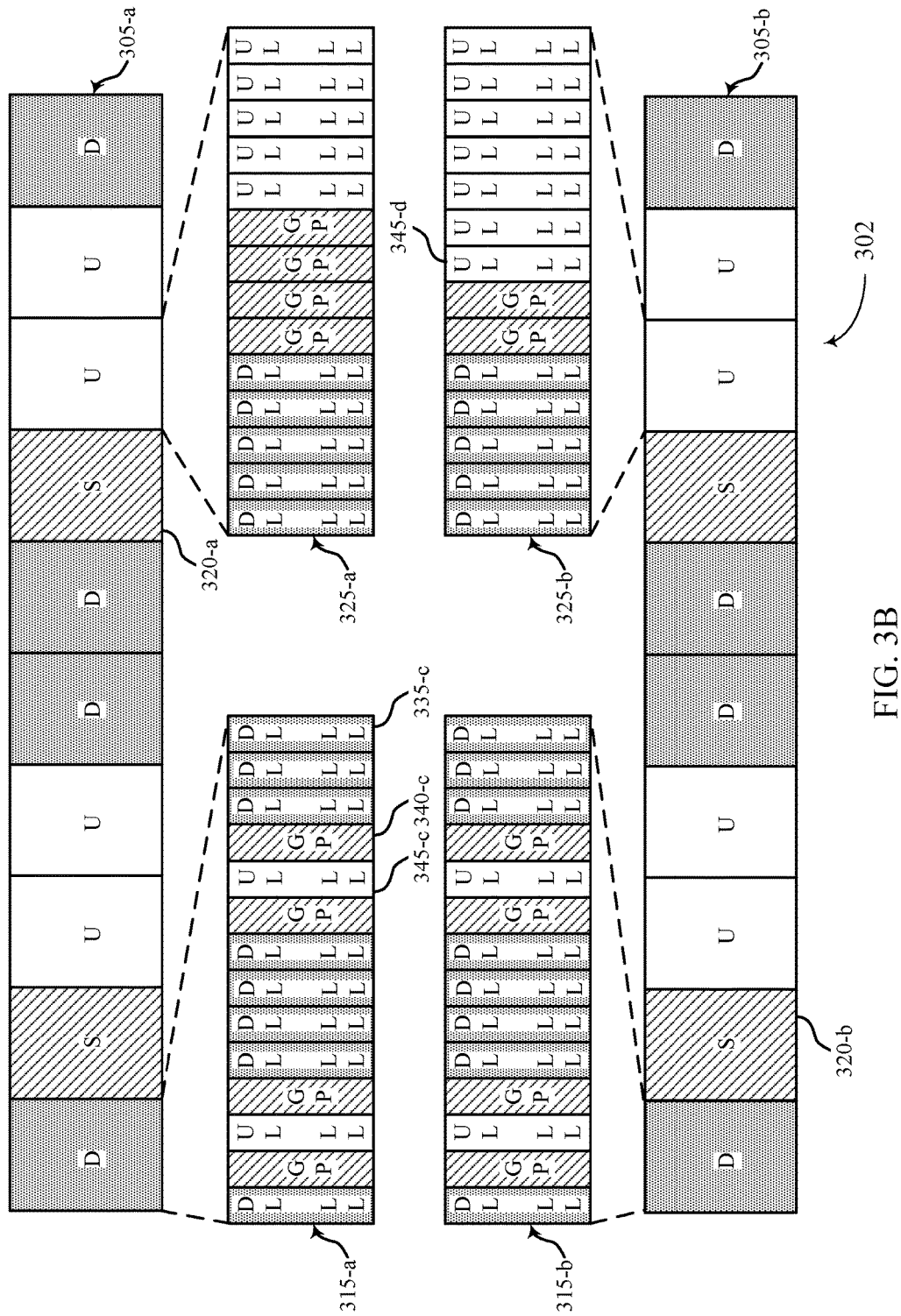
FIGS. 3B-3E illustrate examples of carrier aggregation (CA) frame configurations for LL in TDD in accordance with various aspects of the present disclosure.

FIG. 3B illustrates an example of an expanded view of a LL carrier aggregation (CA) frame configuration 302 for LL in TDD in accordance with various aspects of the present disclosure. CA frame configuration 302 may include a frame 305-a conveyed on a first component carrier (CC1) and a frame 305-b conveyed via a second component carrier (CC2). CA frame 305-a and CA frame 305-b may include a number of LL downlink subframes 315, which may be examples of the LL downlink subframe 315 described with reference to FIG. 3A. CA frame 305-a and CA frame 305-b may also include a number of LL uplink subframes 325, which may be examples of the LL uplink subframe 325 described with reference to FIG. 3A. LL downlink subframes 315 and LL uplink subframes 325 may include a number LL symbols including DL LL downlink symbols 335-c, UL LL symbols 345-c, and guard periods 340-c.

A base station 105 may use CA to communicate with a UE 115 using CA frame 305-a and CA frame 305-b, such as described with reference to FIG. 1. For CA using intra-band frequencies, each CA frame 305-a, 305-b may be transmitted according to a half-duplexing scheme. For example, a base station 105 may determine the same subframe configuration for CA frame 305-a and CA frame 305-b. In the present example, LL subframes 0/4/5/9 of CA frames 305-a, 305-b are scheduled for downlink and LL subframes 2/3/7/8 of CA frames 305-a and 305-b are scheduled for uplink. Special subframes 320-a and 320-b separate the downlink subframes from the uplink subframes and allow a UE 115 to reconfigure. Accordingly, a UE 115 may be configured for reception during LL subframes 0/4/5/9 and change (during subframes 0 and 6) to a transmission configuration during LL subframes 2/3/7/8.

The LL symbols of LL downlink subframe 315-a, 315-b and LL uplink subframes 325-a, 325-b may be arranged according to a configuration determined by a base station 105. The LL symbol configuration may be such that a UE 115 is scheduled to either receive LL symbols or transmit LL symbols. For example, during the first LL symbol of LL downlink subframe 315-a and LL downlink subframe 315-b a UE may receive information in a downlink from a base station 105-a. In some cases, a UE 115 may treat LL subframes as subframes without LL downlink symbols 335 and LL uplink symbols 345 (i.e., the UE 115 may ignore the LL symbols within the LL subframe). The LL symbol configuration of LL downlink subframes 315-a, 315-b may be different from the symbol configuration of LL uplink subframes 325-a, 325-b.

In some cases, not all CCs may transmit or receive in a given symbol. That is, some CCs may be idle for a variety of reasons, including lack of traffic, different interference protection needs, or different UL timing advances in different CCs. As an example of the latter case, a macro cell may utilize a longer GP to protect UL reception, which can potentially experience interference from DL transmission. As illustrated by LL uplink symbol 345-d, an LL symbol may be used for transmission in one CC if there is a GP in another CC (i.e., so UL and DL TTIs do not conflict between CCs).

Figure 3C:
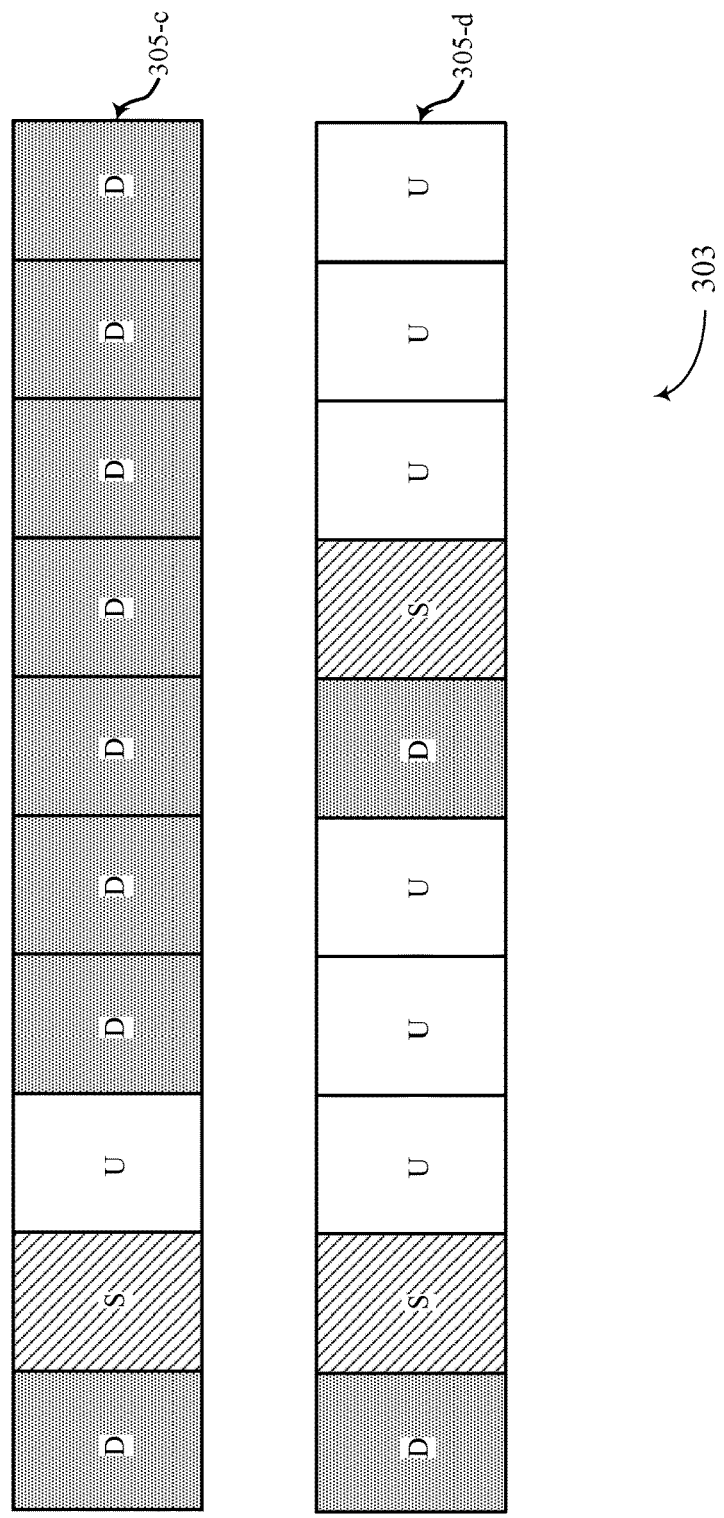

In some examples, complementary LL subframe configurations may be used for CA frames conveyed by different component carriers (e.g., CA frame 305-a and CA frame 305-b). A base station 105 may select configurations such that one CC is associated with conveying LL downlink subframes and that another CC is associated with conveying LL uplink subframes. In another example, a base station 105 may select a LL subframe configuration such that LL subframes of a chosen direction (e.g., uplink) are substantially continuously supported. FIG. 3C illustrates an example of complementary LL subframe configuration 303 for carrier aggregation (CA) in accordance with various aspects of the present disclosure. Complementary LL subframe configuration 303 may include a frame 305-c conveyed on a first component carrier (CC1) and a frame 305-d conveyed via a second component carrier (CC2). According to the example of FIG. 3C, CC1 may have TDD Configuration 5 (Table 1) and may be configured for DL LL. CC2 may have TDD Configuration 0 (Table 1) and may be configured for UL LL. In such cases, DL LL on CC1 may be schedule during subframes 0/1/3/4/5/6/7/8/9; and UL LL on CC2 may be scheduled during subframes 1/2/3/4/6/7/8/9. Thus, DL LL interruption for a UE 115 configured with CC1 and CC2 may be limited to subframe 2, while UL LL interruption for the UE 115 may be limited to subframes 0 and 5 and partially with special subframes 1 and 6.

Figure 3D:
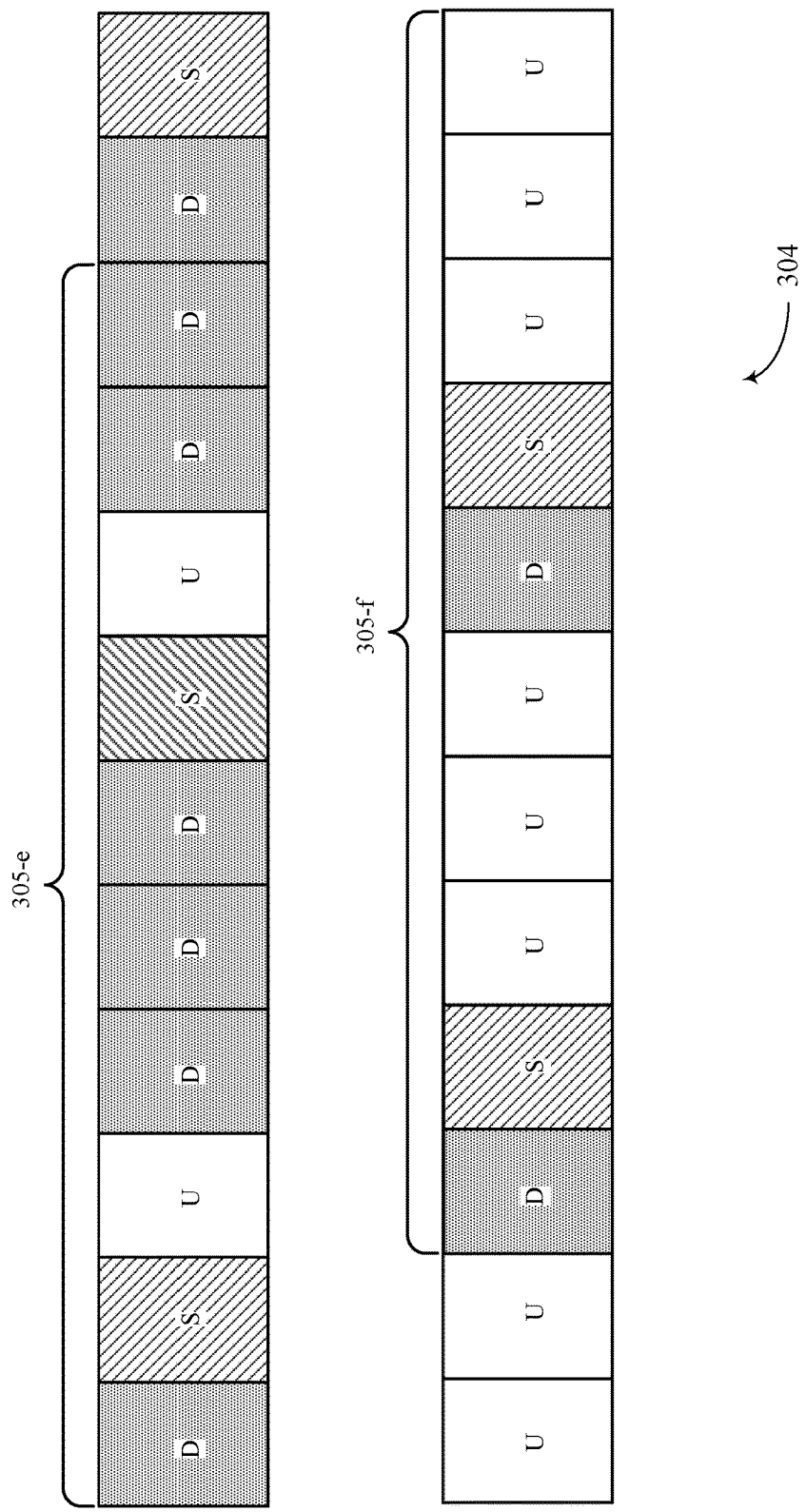

In some cases, frame offsets for different CCs may be employed such that LL can be enabled in substantially every subframe. FIG. 3D illustrates an example of complementary LL subframe configuration 304 for carrier aggregation (CA) in accordance with various aspects of the present disclosure. Complementary LL subframe configuration 304 may include a frame 305-*e* conveyed on a first component carrier (CC1) and offset (e.g., by 2 ms) from a frame 305-*f* conveyed via a second component carrier (CC2). In the example of FIG. 3D, CC1 may have TDD Configuration 2 (Table 1) and CC2 may have TDD Configuration 0 (Table 1). With a two-subframe offset (e.g., 2 ms offset), DL LL and UL LL can be substantially continuous for a LL UE 115 configured with both CCs. That is, in such an example, DL LL may be configured on CC1 during subframes 0/1/3/4/5/6/8/9 and on CC1 during subframes 0/5, and UL LL may be configured on CC1 during subframes 2/7 and on CC2 during subframes 1/2/3/4/6/7/8/9.

Figure 3E:
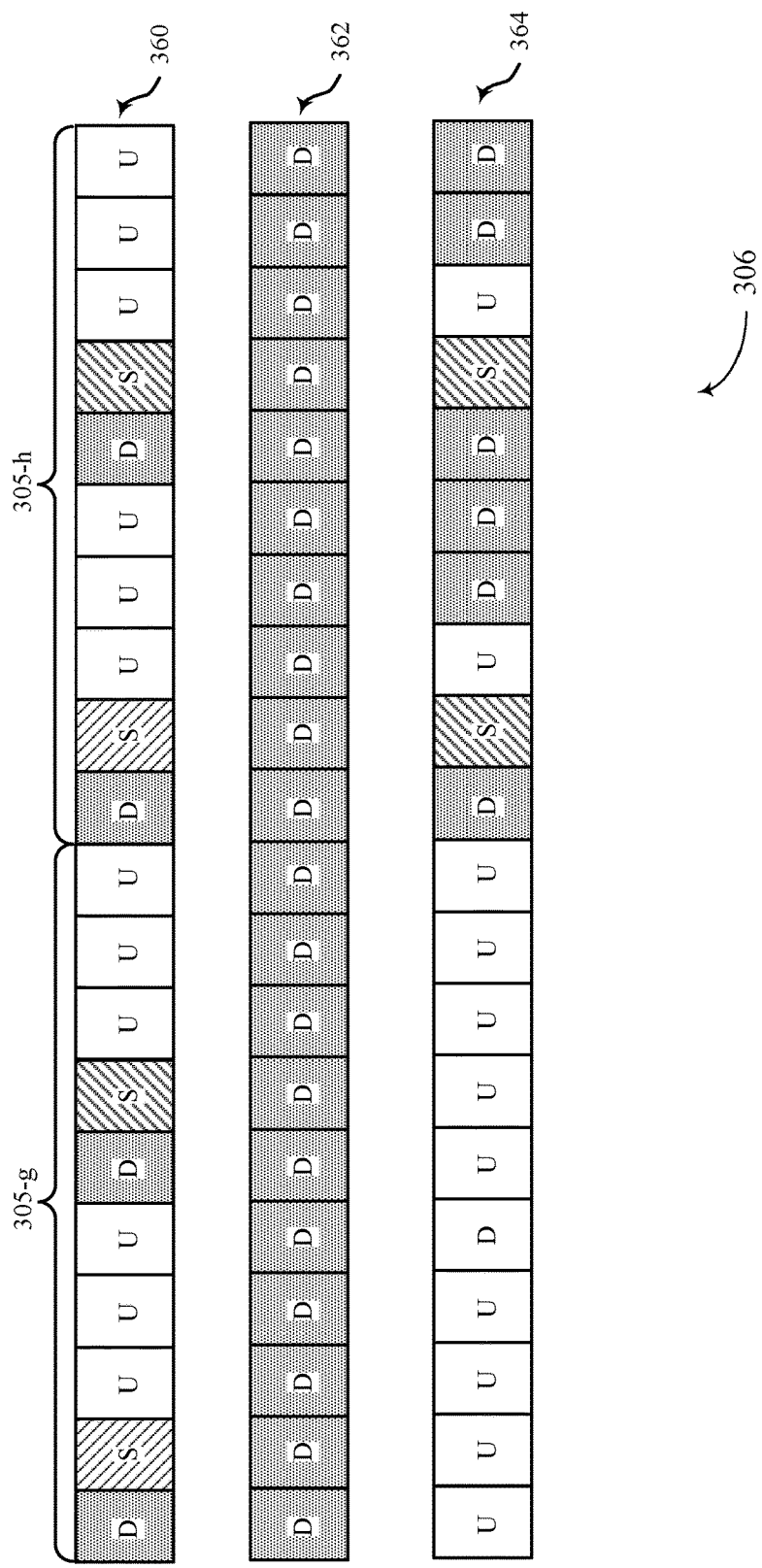

In still other examples, additional TDD configurations—e.g., beyond those listed in Table 1—may be employed to enable LL in substantially every subframe. FIG. 3E illustrates an example of complementary LL subframe configuration 306 for carrier aggregation (CA) in accordance with various aspects of the present disclosure. Complementary LL subframe configuration 306 may include a frame 305-*g* and 305-*h* conveyed on a first component carrier (CC1) 360, a second component carrier (CC2) 362, and a third component carrier (CC3) 364. According to the example of FIG. 3E, CC2 362 may have a DL-only configuration during frame 305-*g* and 305-*h*, and CC3 364 may have an UL-only configuration during frame 305-*g*. CC2 362 and CC3 364 may be capable of dynamically changing configuration according to LL scheduling needs. For instance, CC2 362 or CC3 364, or both, may be an example of an eCC described above.

Figure 4:
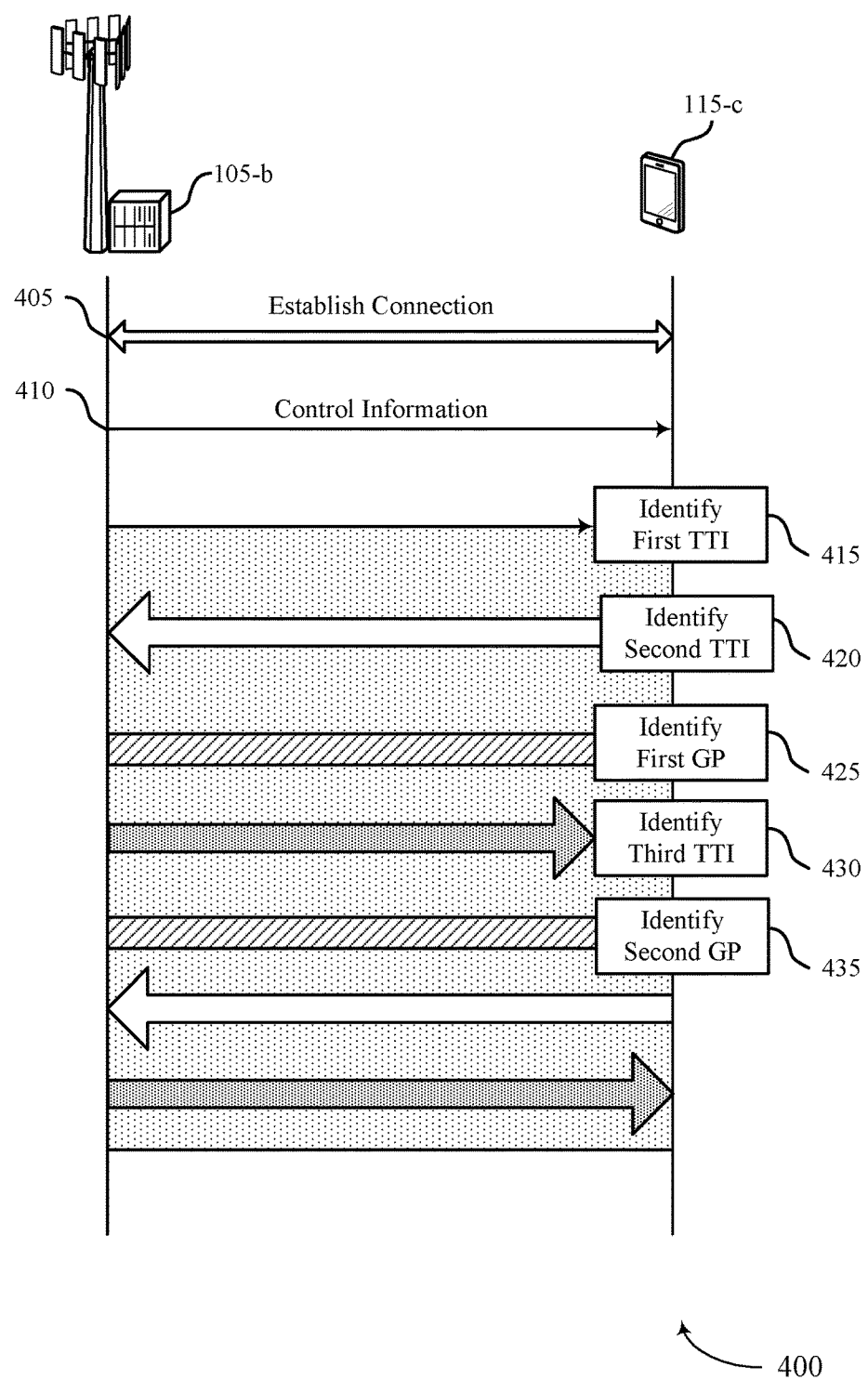
FIG. 4 illustrates an example of a process flow that supports LL in TDD in accordance with various aspects of the present disclosure.

FIG. 4 illustrates an example of a process flow 400 that supports LL in TDD in accordance with various aspects of the present disclosure. Process flow 400 may include a UE 115-*c*, which may be an example of an LL capable UE 115 described above with reference to FIGS. 1-2. Process flow 400 may also include a base station 105-*b*, which may be an example of a base station 105 described above with reference to FIGS. 1-2.

At step 405 base station 105-*b* and UE 115-*c* may establish a connection on a TDD carrier. In some examples, the TDD carrier may be one of at least two CCs configured for CA operation. In some examples, the second CC may also be a TDD CC and may be configured for half-duplex operation.

At step 410, base station 105-*b* may transmit control information to UE 115-*c*. For example, base station 105-*b* may transmit radio resource control (RRC) and PDCCH control information. The control information may include information associated with an LL configuration.

At step 415, UE 115-*c* may identify a first TTI of a TDD carrier. The first TTI may have a first TTI duration (e.g., a subframe) and may be configured for transmission in a first direction (e.g., DL as illustrated, but UL in other cases). In some cases, the first TTI may be a LL DL subframe transmitted from base station 105-*b*. In some examples, the first TTI duration may be the length of an LTE subframe. In some examples, identifying the first TTI includes receiving control signaling indicative of the first TTI (e.g., via the control information sent at step 410).

At step 420, UE 115-*c* may identify a second TTI within the first TTI. In some examples, identifying the second TTI may include receiving control signaling indicative of the second TTI. The second TTI may have a second TTI duration (e.g., a symbol period) and may be configured for transmission in a second direction (e.g., UL or DL) that may be reverse from the first direction. In some cases, the second TTI may be a LL UL symbol. In some examples, the second TTI duration may be the length of one LTE symbol period. UE 115-*c* may communicate in the second direction during the second TTI (e.g., UE 115-*c* may transmit during a LL UL symbol). In some examples, communicating includes transmitting a signal during the second TTI. In some examples, identifying the second TTI may include determining that the first TTI is not scheduled for a system information block 1 (SIB1) transmission, a CRS transmission, a broadcast channel, a synchronization channel, or a common search space.

At step 425, UE 115-*c* may identify a first guard period (GP). The first GP may be a LL GP as described with reference to FIGS. 2-3B. For example, the first GP may not be scheduled for communications. The first GP may separate TTIs scheduled for different directions such that UE 115-*c* may be reconfigured during the first GP. The first GP may be the same length as the second TTI duration (e.g., the first GP may be the length of a symbol). In other examples, the first GP may be a different duration than that of the second TTI (e.g., the first GP may be a fraction of a symbol length). In some cases, the device may refrain from communicating during a guard period within the first TTI.

At step 430, UE 115-*c* may identify a third TTI within the first TTI. The third TTI may have a duration the same as the second TTI duration and may be configured for transmission in the first direction. For example, the third TTI may be a LL DL symbol such as described with reference to FIGS. 2-3B. UE 115-*c* may identify a guard period between the second TTI and the third TTI. For example, the first GP may be scheduled during the first TTI such that the first GP is between the second TTI and the third TTI.

At step 435, UE 115-*c* may identify a second GP within the first TTI. The second GP may be an example of a LL GP as described with reference to FIGS. 2-3B. The second GP may have the same duration as the second TTI. However, the second GP may have a different duration as the second TTI. In some examples, the sum of the duration of the first GP and the duration of the second GP is equal to the second TTI duration (i.e., equal to a single symbol period). In other words, the GP may be less than the TTI duration to reduce overhead.

In some examples UE 115-*c* may identify a special subframe having the first TTI duration and including a DL portion, an UL portion, and a guard period. The guard period may include a set of TTIs, each of which may have a length the same as the second TTI duration. The set of TTIs may be configured for transmissions in the first or second directions (e.g., downlink or uplink).

The device may also communicate in the first direction on a second TDD CC during a third LL TTI aligned with a guard period. In some examples, the two CCs have a complementary transmission configuration for a frame, where the complementary transmission configuration, as describe with reference to FIGS. 3C-3D. The complementary transmission configuration may include TTIs configured for transmission in the first direction in substantially every subframe of the frame, and at least one TTI configured for transmission in the second direction. In some examples, the complementary transmission configuration includes an offset frame structure for the TDD carrier and the second CC. In some examples, the plurality of CCs configured for CA operation also includes a third CC having a frame comprising TTIs of the first duration each configured for transmission in one of the first or second directions. In some examples, the second TTI is configured for transmission in a third direction on the TDD carrier in a first time period, and is configured for transmission on the second CC in the third direction in a second time period.

Figure 5:
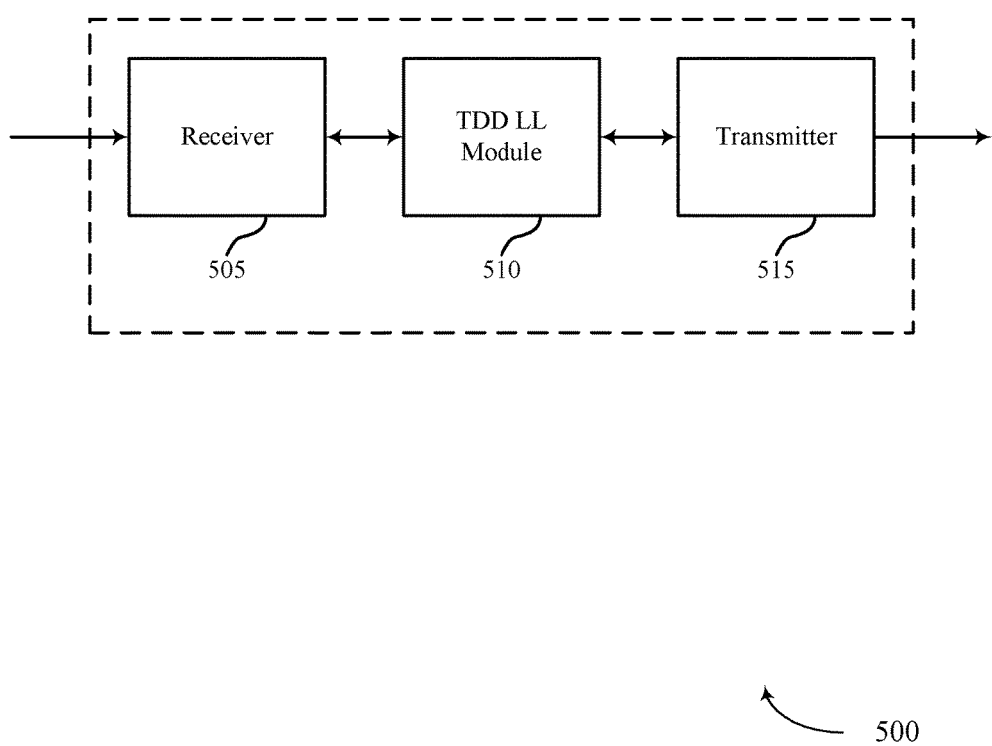
FIG. 5 shows a block diagram of a wireless device that supports LL in TDD in accordance with various aspects of the present disclosure.

FIG. 5 shows a block diagram of a wireless device 500 that supports LL in TDD in accordance with various aspects of the present disclosure. Wireless device 500 may be an example of aspects of a device described with reference to FIGS. 1-4. Wireless device 500 may include a receiver 505, a TDD LL module 510, or a transmitter 515. Wireless device 500 may also include a processor. Each of these components may be in communication with one another.

The receiver 505 may receive information such as packets, user data, or control information associated with various information channels (e.g., control channels, data channels, and information related to LL in TDD, etc.). Information may be passed on to the TDD LL module 510, and to other components of wireless device 500. In some examples, receiver 505 may receive control signaling indicative of a first TTI (e.g., a subframe), control signaling indicative of a second TTI (e.g., a symbol period), or another signal during the second TTI. In some cases, receiver 505 may illustrate aspects of transceiver 835 of FIG. 8 or transceiver 935 of FIG. 9.

The TDD LL module 510 may identify a first TTI of a TDD carrier, the first TTI having a first TTI duration and configured for transmission in a first direction. The TDD LL module 510 may also identify a second TTI within the first TTI, the second TTI having a second TTI duration and configured for transmission in a second direction that is reverse from the first direction. The TDD LL module 510, in combination with the receiver 505 or transmitter 515, for example, may communicate in the second direction during the second TTI. In some cases, TDD LL module 510 may illustrate aspects of processor 805 or TDD LL module 810 of FIG. 8 or processor 905 or base station TDD LL module 910 of FIG. 9.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some examples, the transmitter 515 may communicate in the second direction during the second TTI. In some cases, transmitter 515 may illustrate aspects of transceiver 835 of FIG. 8 or transceiver 935 of FIG. 9.

Figure 6:
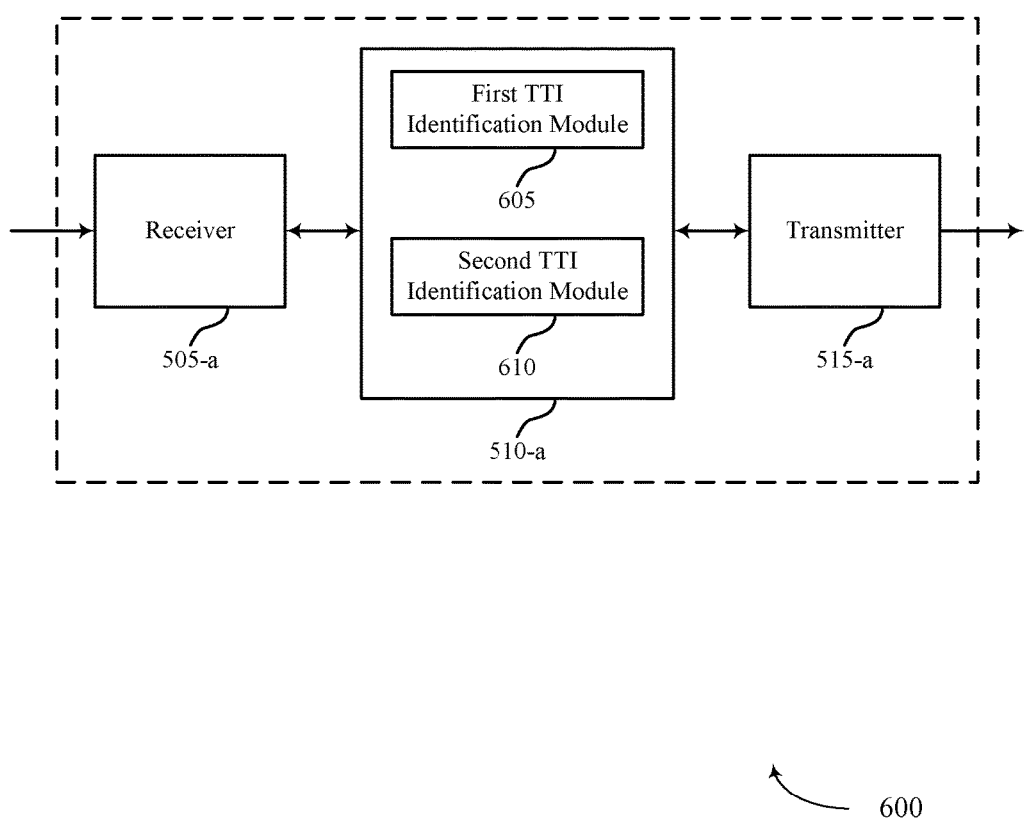
FIG. 6 shows a block diagram of a wireless device that supports LL in TDD in accordance with various aspects of the present disclosure.

FIG. 6 shows a block diagram of a wireless device 600 that supports LL in TDD in accordance with various aspects of the present disclosure. Wireless device 600 may be an example of aspects of a wireless device 500 or a device described with reference to FIGS. 1-5. Wireless device 600 may include a receiver 505-a, a TDD LL module 510-a, or a transmitter 515-a. Wireless device 600 may also include a processor. Each of these components may be in communication with one another. The TDD LL module 510-a may also include a first TTI identification module 605, and a second TTI identification module 610.

The receiver 505-a may receive information which may be passed on to TDD LL module 510-a, and to other components of device 600. The TDD LL module 510-a may perform the operations described above with reference to FIG. 5. The transmitter 515-a may transmit signals received from other components of wireless device 600. In some cases, receiver 505-a may illustrate aspects of transceiver 835 of FIG. 8 or transceiver 935 of FIG. 9. In some examples, TDD LL module 510-a may illustrate aspects of processor 805 or TDD LL module 810 of FIG. 8 or processor 905 or base station TDD LL module 910 of FIG. 9. In some cases, transmitter 515-a may illustrate aspects of transceiver 835 of FIG. 8 or transceiver 935 of FIG. 9.

The first TTI identification module 605 may identify a first TTI of a TDD carrier, the first TTI having a first TTI duration and configured for transmission in a first direction as described above with reference to FIGS. 2-4. In some examples, the first TTI duration is an LTE subframe.

The second TTI identification module 610 may identify a second TTI within the first TTI, the second TTI having a second TTI duration (e.g., one LTE symbol period) and configured for transmission in a second direction that is reverse from the first direction as described above with reference to FIGS. 2-4. The second TTI identification module 610 may also identify a third TTI within the first TTI, the third TTI having the second TTI duration and configured for transmission in the first direction. In some examples, the first direction may be an UL direction and the second direction may be a DL direction. In some examples, the first direction may be a DL direction and the second direction may be an UL direction. In some examples, identifying the second TTI includes determining that the first TTI may be not scheduled for a system information block 1 (SIB1) transmission. In some examples, identifying the second TTI includes determining that the second TTI may be not scheduled for a CRS transmission. In some examples, identifying the second TTI includes determining that the second TTI may be not scheduled in a resource block reserved for at least one of a physical broadcast channel, a synchronization channel, or a common search space. In some examples, the second TTI may be configured for transmission in a third direction on the TDD carrier in a first time period, and may be configured for transmission on the second CC in the third direction in a second time period.

Figure 7:
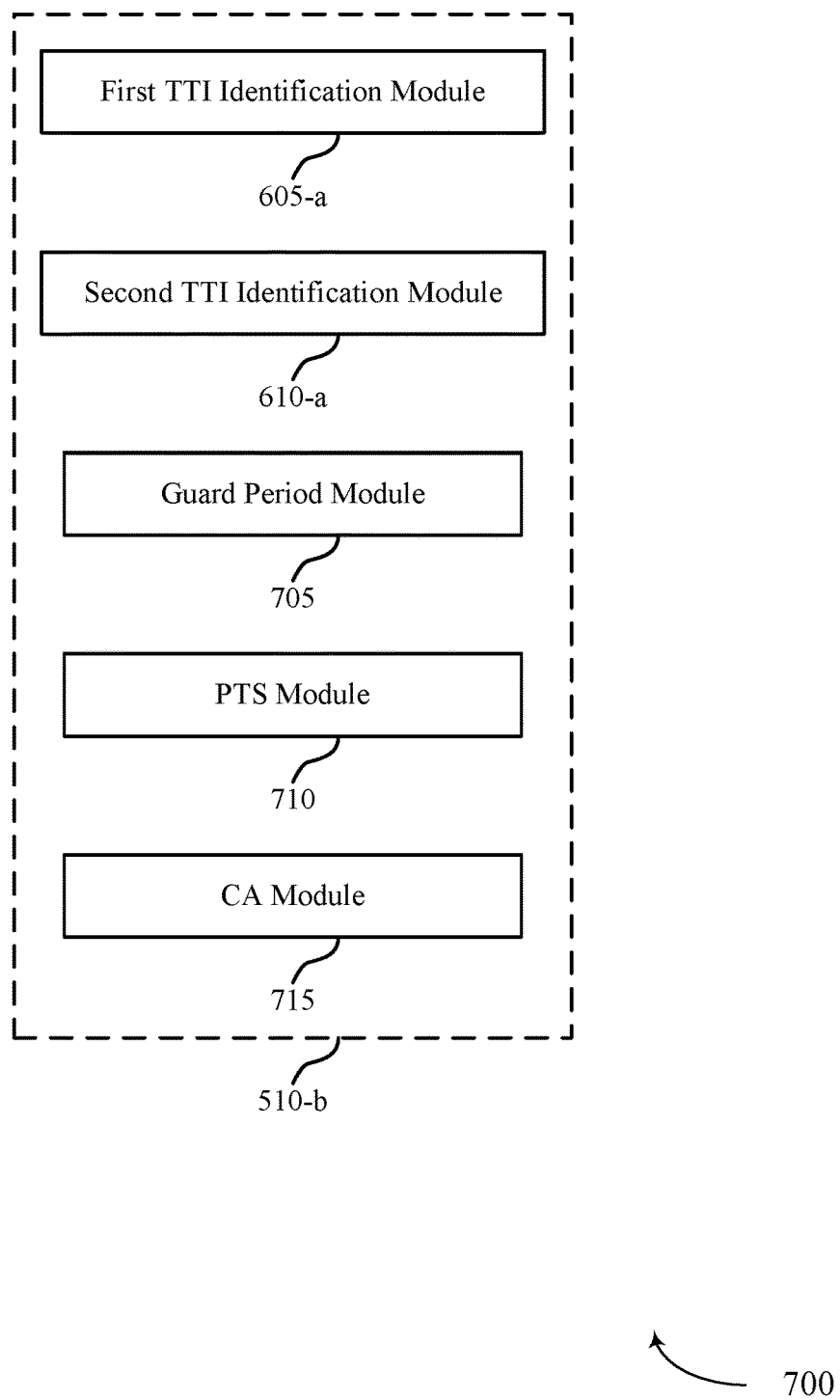
FIG. 7 shows a block diagram of a module of a wireless device that supports LL in TDD in accordance with various aspects of the present disclosure.

FIG. 7 shows a block diagram 700 of a TDD LL module 510-b which may be a component of a wireless device 500 or a wireless device 600 that supports LL in TDD in accordance with various aspects of the present disclosure. The TDD LL module 510-b may be an example of aspects of a TDD LL module 510 described with reference to FIGS. 5-6. The TDD LL module 510-b may include a first TTI identification module 605-a, and a second TTI identification module 610-a. Each of these modules may perform the functions described above with reference to FIG. 6. The TDD LL module 510-b may also include a guard period module 705, a PTS module 710, and a CA module 715.

The guard period module 705 may identify a first guard period between the second TTI and the third TTI, where the first guard period is within the first TTI as described above with reference to FIGS. 2-4. The guard period module 705 may also identify a second guard period within the first TTI. In some examples, a sum of a duration of the first guard period and a duration of the second guard period may be equal to the second TTI duration. The guard period module 705 may also refrain from communicating during a guard period within the first TTI. The guard period module 705 may also communicate in the first direction on the second TDD CC during a third TTI having the second TTI duration that is aligned with the guard period.

The PTS module 710 may identify a special subframe having the first TTI duration and comprising a DL portion, an UL portion, and a guard period, the guard period including one or more TTIs configured for transmissions in the first or second directions as described above with reference to FIGS. 2-4.

The CA module 715 may be configured such that the TDD carrier may be a CC of a plurality of CCs configured for CA operation, the plurality of CCs comprising a second CC as described above with reference to FIGS. 2-4. In some examples, the second CC may be a TDD CC and the first TTI and the second TTI are both configured for half-duplex operation. In some examples, the plurality of CCs configured for CA operation may include a third CC having a frame that includes TTIs of the first duration each configured for transmission in one of the first or second directions.

The components of the wireless device 500, wireless device 600 and TDD LL module 510-*b* may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 8:
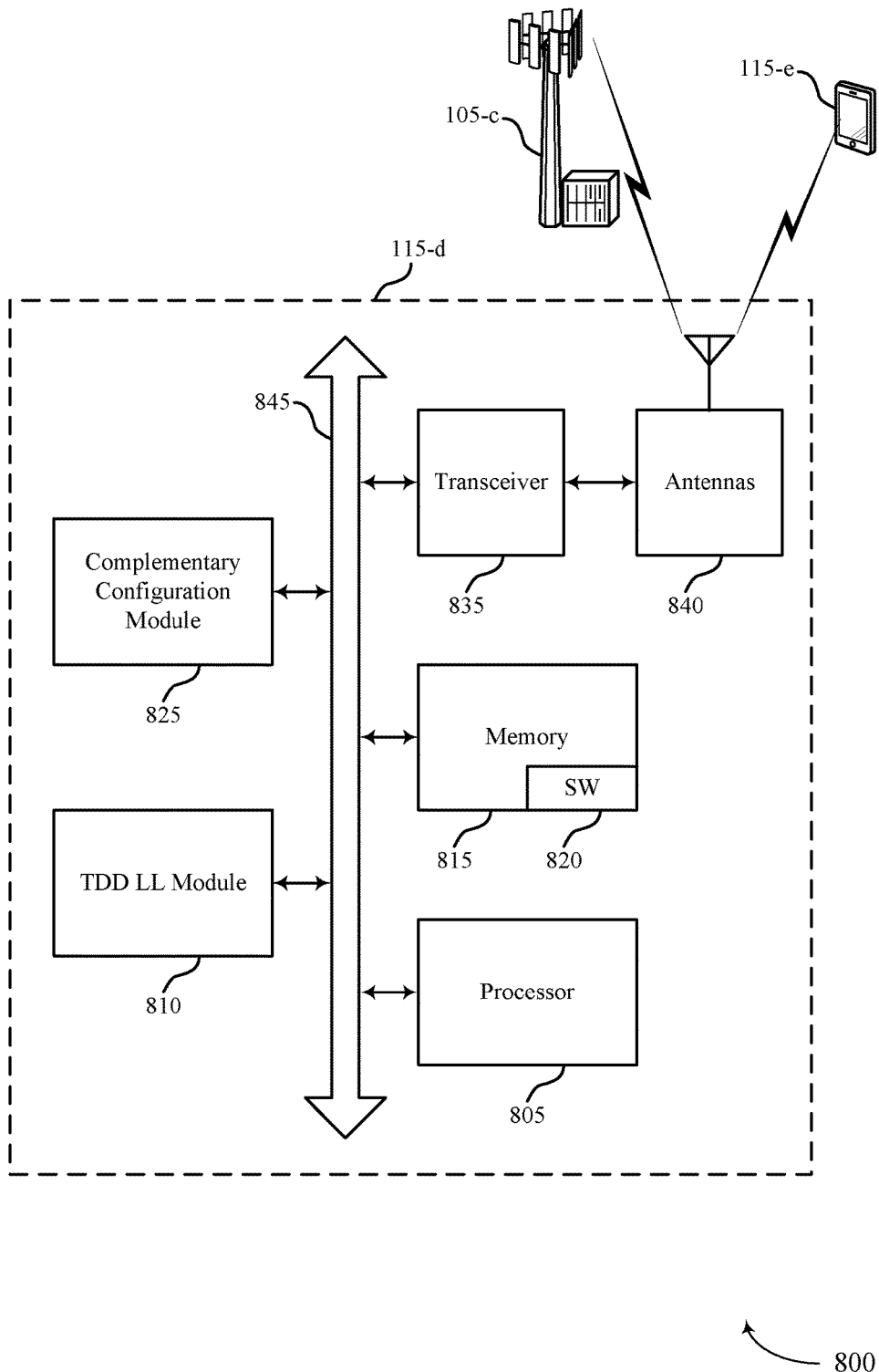
FIG. 8 illustrates a block diagram of a system including a device that supports LL in TDD in accordance with various aspects of the present disclosure.

FIG. 8 illustrates a block diagram of a system 800 including a UE that supports LL in TDD in accordance with various aspects of the present disclosure. System 800 may include UE 115-*d*, which may be an example of a wireless device 500, a wireless device 600, or a UE 115 described above with reference to FIGS. 1, 2, and 5-7. UE 115-*d* may include a TDD LL module 810, which may be an example of a TDD LL module 510 described with reference to FIGS. 5-7. In some examples, UE 115-*d* may include a complementary configuration module 825. UE 115-*d* may also include components for bi-directional voice and data communications including components for transmitting communications and components for receiving communications. For example, UE 115-*d* may communicate bi-directionally with base station 105-*c* or UE 115-*e*. In some cases, TDD LL module 810 may illustrate aspects of TDD LL module 510 of FIG. 5.

The complementary configuration module 825 may be configured to identify and communicate on multiple TDD CCs having a complementary transmission configuration for a frame, where the complementary transmission configuration may include TTIs configured for transmission in the first direction in substantially every subframe of the frame, and at least one TTI configured for transmission in the second direction as described above with reference to FIGS. 2-4. In some examples, the complementary transmission configuration includes an offset frame structure for the TDD CCs, as described with reference to FIG. 3D.

UE 115-*d* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions. In some cases, transceiver 835 may illustrate aspects of receiver 505 of FIG. 5, transmitter 515 of FIG. 5.

The memory 815 may include random access memory (RAM) and read only memory (ROM). The memory 815 may store computer-readable, computer-executable software/firmware code 820 including instructions that, when executed, cause the processor 805 to perform various functions described herein (e.g., LL in TDD, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

Figure 9:
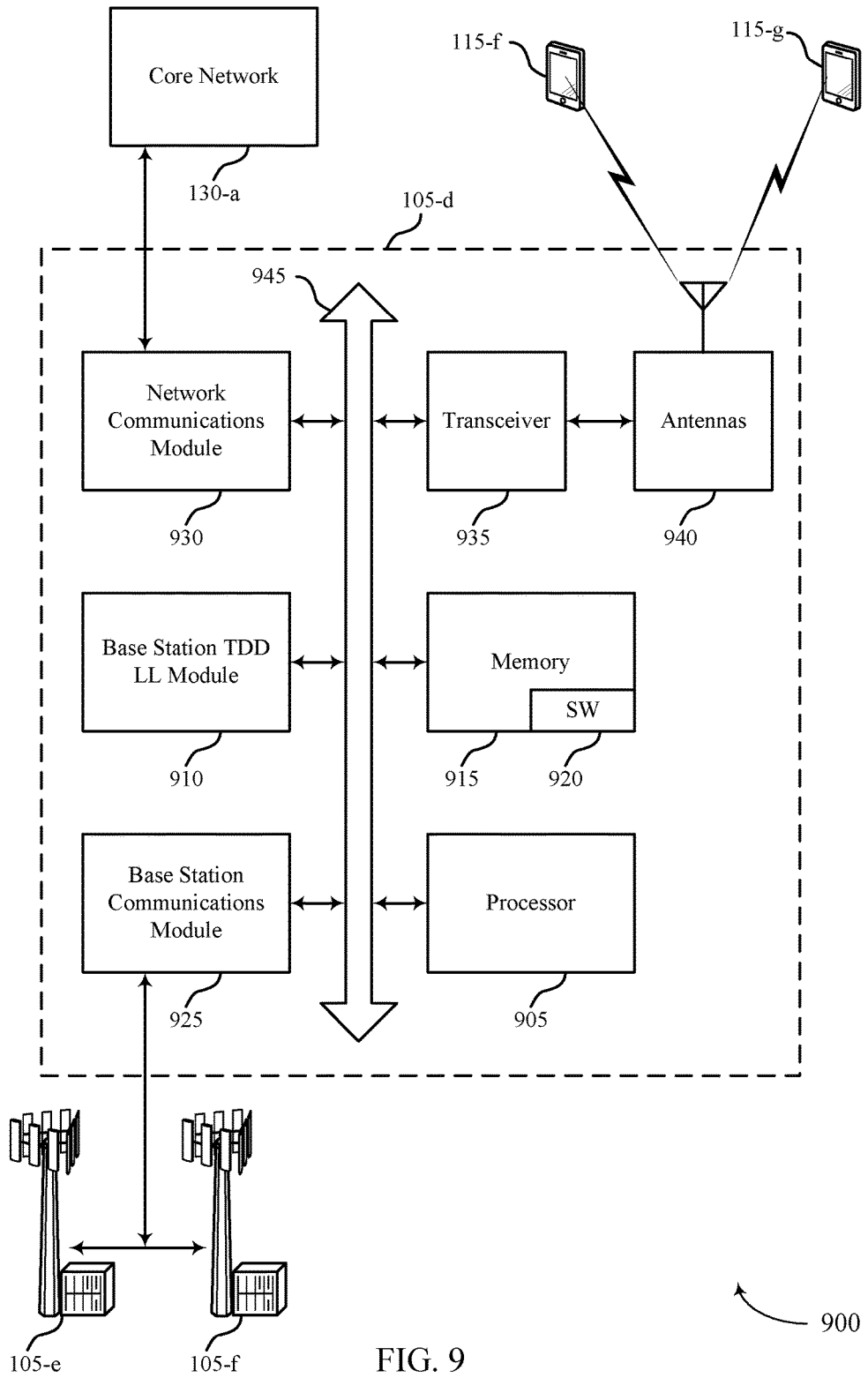
FIG. 9 illustrates a block diagram of a system including a base station that supports LL in TDD in accordance with various aspects of the present disclosure.

FIG. 9 illustrates a block diagram of a system 900 including a base station that supports LL in TDD in accordance with various aspects of the present disclosure. System 900 may include base station 105-*d*, which may be an example of a wireless device 500, a wireless device 600, or a base station 105 described above with reference to FIGS. 1, 2 and 6-8. Base station 105-*d* may include a base station TDD LL module 910, which may be an example of a base station TDD LL module 910 described with reference to FIGS. 6-8. In some cases, base station TDD LL module 910 may illustrate aspects of TDD LL module 510 of FIG. 5. Base station 105-*d* may also include components for bi-directional voice and data communications including components for transmitting communications and components for receiving communications. For example, base station 105-*d* may communicate bi-directionally with UE 115-*f* or UE 115-*g*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications module 925. In some examples, base station communications module 925 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 930.

The base station 105-*d* may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-*d*) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-*d* may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., LL in TDD, selecting coverage enhancement techniques, call processing, database management, message routing, etc.). Alternatively, the software 920 may not be directly executable by the processor 905 but be configured to cause the computer (e.g., when compiled and executed) to perform functions described herein. The processor 905 may include an intelligent hardware device (e.g., a CPU, a microcontroller, an ASIC, etc.). The processor 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

Figure 10:
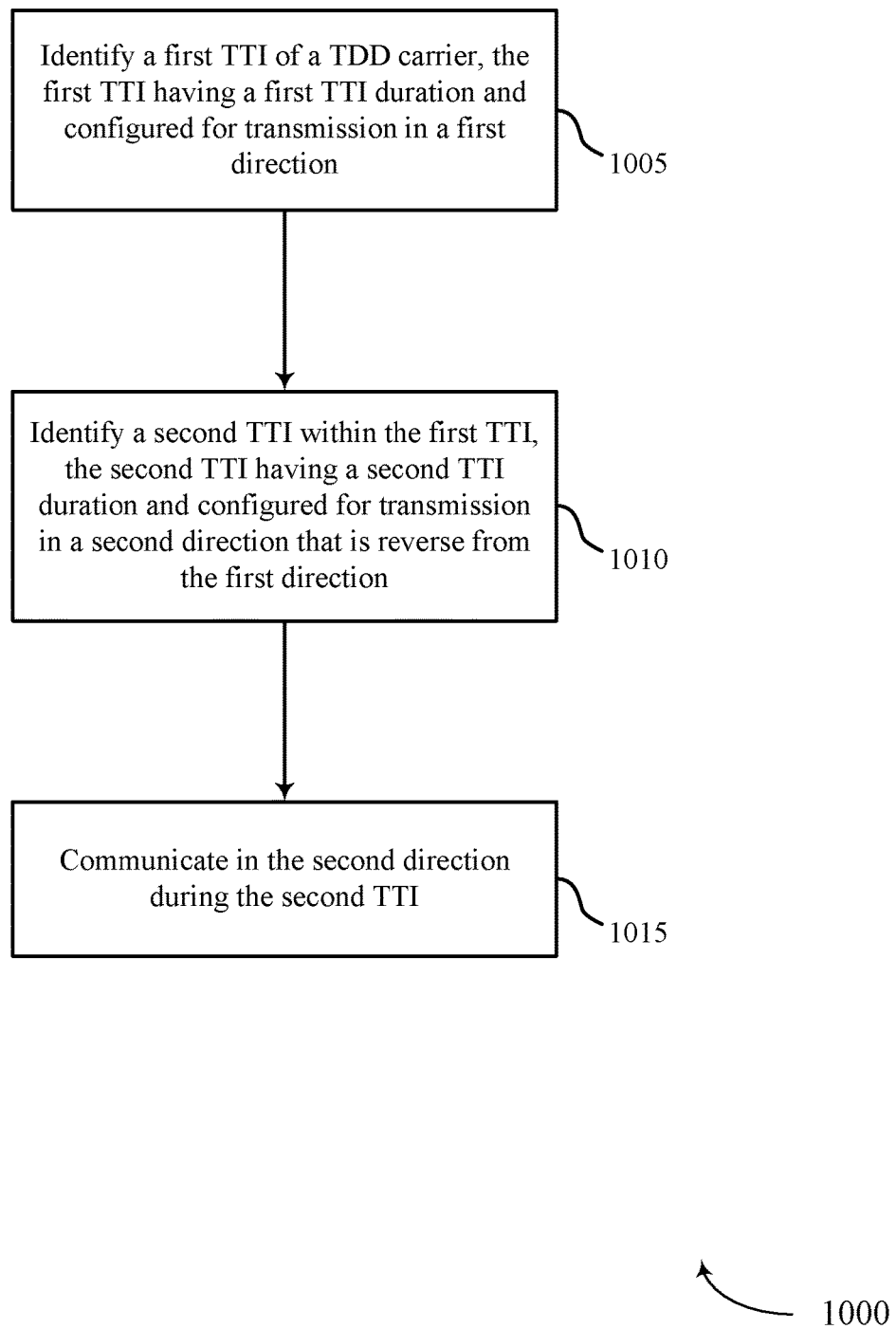
FIG. 10 illustrates a method for LL in TDD in accordance with various aspects of the present disclosure.

FIG. 10 shows a flowchart illustrating a method 1000 for LL in TDD in accordance with various aspects of the present disclosure. The operations of method 1000 may be implemented by a device such as a UE 115 or a base station 105, or its components, as described with reference to FIGS. 1-9. For example, the operations of method 1000 may be performed by the TDD LL module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may identify a first TTI of a TDD carrier, the first TTI having a first TTI duration and configured for transmission in a first direction as described above with reference to FIGS. 2-4. In certain examples, the operations of block 1005 may be performed by the first TTI identification module 605 as described above with reference to FIG. 6. In some cases, the operations of block 1005 may be performed by the processor 805 or TDD LL module 810 of FIG. 8 or processor 905 or base station TDD LL module 910 of FIG. 9.

At block 1010, the device may identify a second TTI within the first TTI, the second TTI having a second TTI duration and configured for transmission in a second direction that is reverse from the first direction as described above with reference to FIGS. 2-4. In certain examples, the operations of block 1010 may be performed by the second TTI identification module 610 as described above with reference to FIG. 6. In some cases, the operations of block 1010 may be performed by the processor 805 or TDD LL module 810 of FIG. 8 or processor 905 or base station TDD LL module 910 of FIG. 9.

At block 1015, the device may communicate in the second direction during the second TTI as described above with reference to FIGS. 2-4. In certain examples, the operations of block 1015 may be performed by the transmitter 515 as described above with reference to FIG. 5. In some cases, the operations of block 1015 may be performed by the transceiver 835 of FIG. 8 or the transceiver 935 of FIG. 9.

Figure 11:
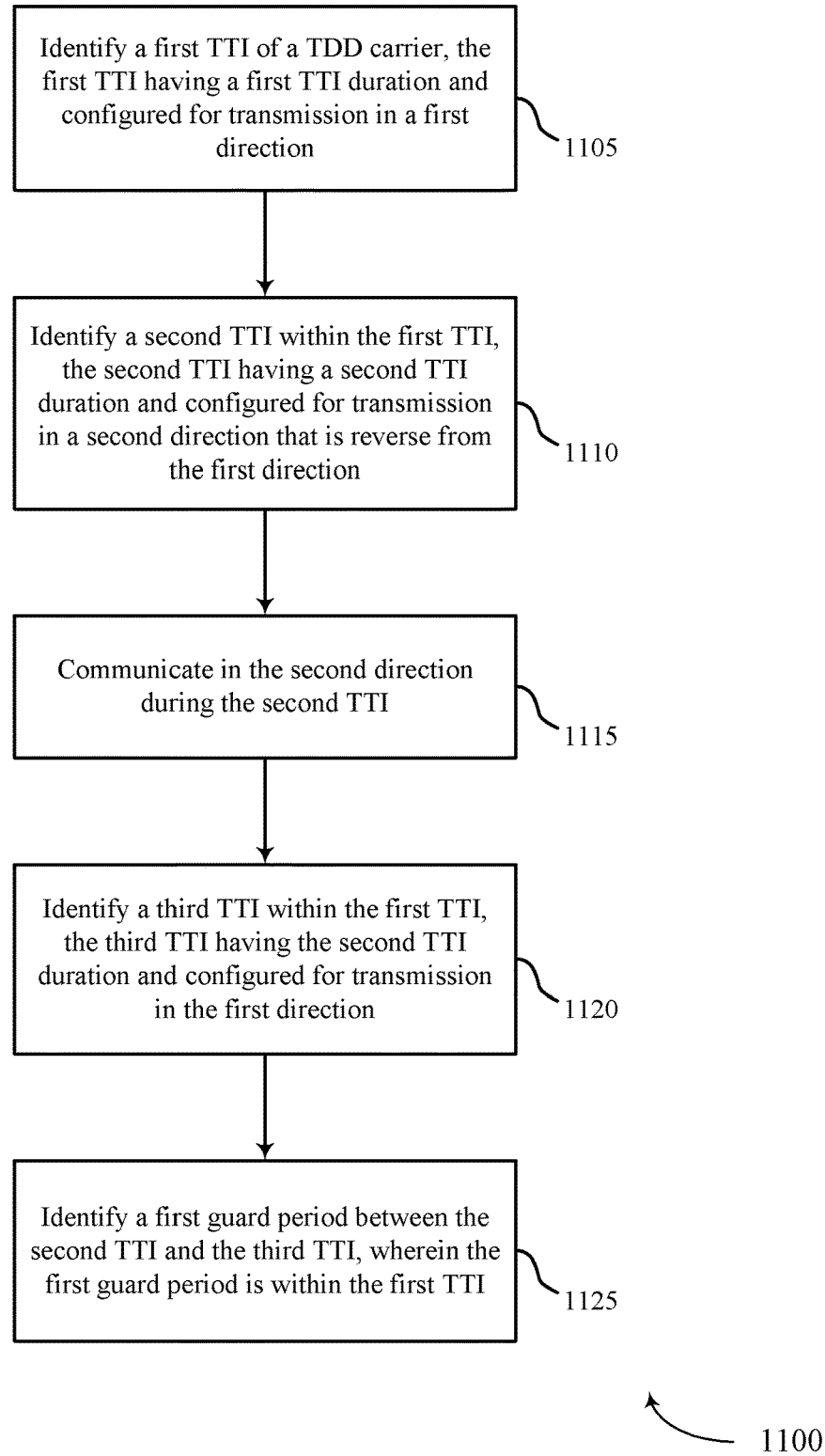
FIG. 11 illustrates a method for LL in TDD in accordance with various aspects of the present disclosure.

FIG. 11 shows a flowchart illustrating a method 1100 for LL in TDD in accordance with various aspects of the present disclosure. The operations of method 1100 may be implemented by a device such as a UE 115 or a base station 105 or its components with reference to FIGS. 1-9.

In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may identify a first TTI of a TDD carrier, the first TTI having a first TTI duration and configured for transmission in a first direction as described above with reference to FIGS. 2-4. In certain examples, the operations of block 1105 may be performed by the first TTI identification module 605 as described above with reference to FIG. 6. In some cases, the operations of block 1105 may be performed by the processor 805 or TDD LL module 810 of FIG. 8 or processor 905 or base station TDD LL module 910 of FIG. 9.

At block 1110, the device may identify a second TTI within the first TTI, the second TTI having a second TTI duration and configured for transmission in a second direction that is reverse from the first direction as described above with reference to FIGS. 2-4. In certain examples, the operations of block 1110 may be performed by the second TTI identification module 610 as described above with reference to FIG. 6. In some cases, the operations of block 1110 may be performed by the processor 805 or base station TDD LL module 810 of FIG. 8 or processor 905 or base station TDD LL module 910 of FIG. 9.

At block 1115, the device may communicate in the second direction during the second TTI as described above with reference to FIGS. 2-4. In certain examples, the operations of block 1115 may be performed by the transmitter 515 as described above with reference to FIG. 5. In some cases, the operations of block 1115 may be performed by the transceiver 835 of FIG. 8 or the transceiver 935 of FIG. 9.

At block 1120, the device may identify a third TTI within the first TTI, the third TTI having the second TTI duration and configured for transmission in the first direction as described above with reference to FIGS. 2-4. In certain examples, the operations of block 1120 may be performed by the second TTI identification module 610 as described above with reference to FIG. 6. In some cases, the operations of block 1120 may be performed by the processor 805 or TDD LL module 810 of FIG. 8 or processor 905 or base station TDD LL module 910 of FIG. 9.

At block 1125, the device may identify a first guard period between the second TTI and the third TTI, where the first guard period is within the first TTI as described above with reference to FIGS. 2-4. In certain examples, the operations of block 1125 may be performed by the guard period module 705 as described above with reference to FIG. 7. In some cases, the operations of block 1125 may be performed by the processor 805 or TDD LL module 810 of FIG. 8 or processor 905 or base station TDD LL module 910 of FIG. 9.

Figure 12:
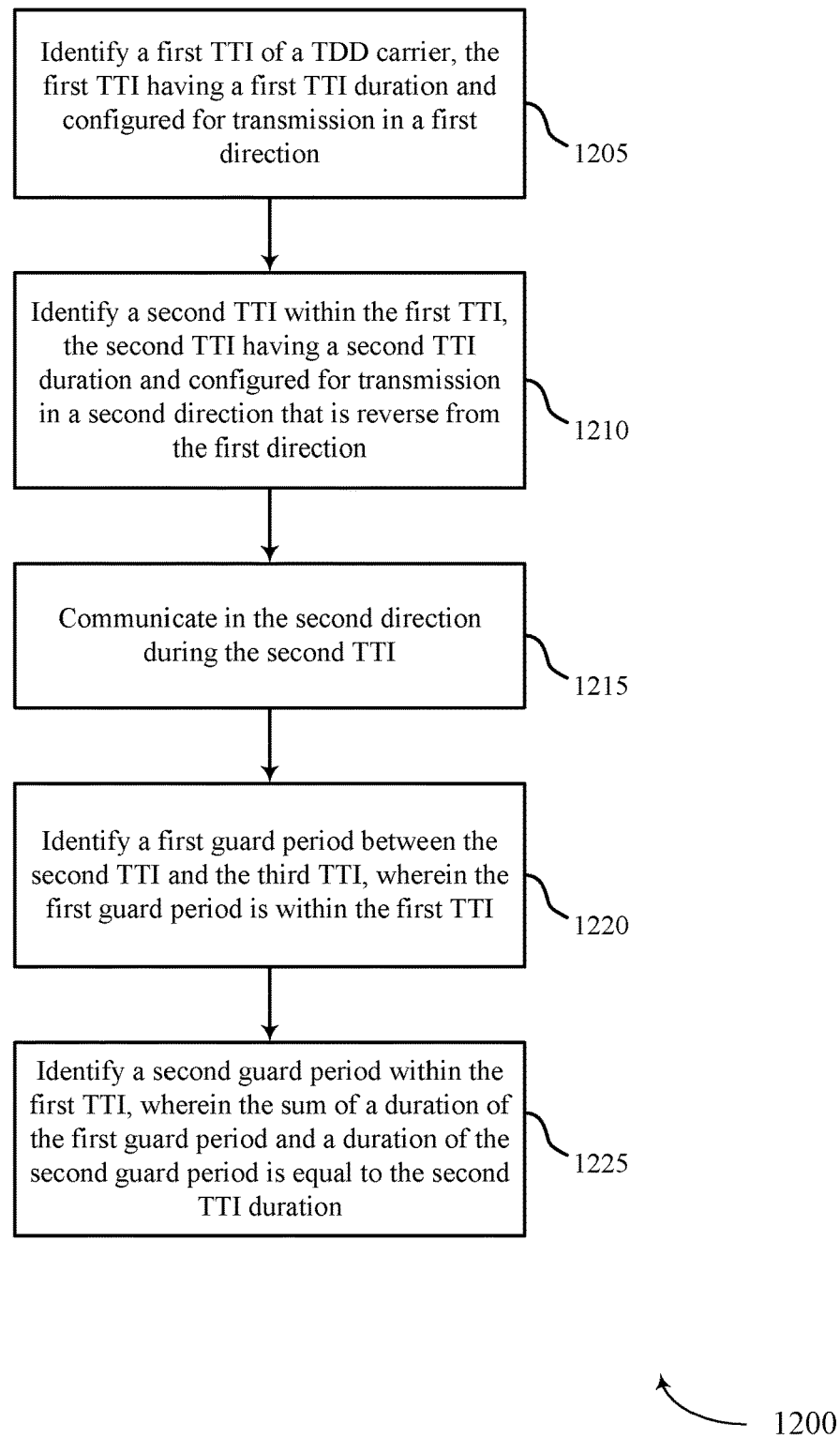
FIG. 12 illustrates a method for LL in TDD in accordance with various aspects of the present disclosure.

FIG. 12 shows a flowchart illustrating a method 1200 for LL in TDD in accordance with various aspects of the present disclosure. The operations of method 1200 may be implemented by a device such as a UE 115 or a base station 105 or its components as described with reference to FIGS. 1-9. For example, the operations of method 1200 may be performed by the TDD LL module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may identify a first TTI of a TDD carrier, the first TTI having a first TTI duration and configured for transmission in a first direction as described above with reference to FIGS. 2-4. In certain examples, the operations of block 1205 may be performed by the first TTI identification module 605 as described above with reference to FIG. 6. In some cases, the operations of block 1205 may be performed by the processor 805 or TDD LL module 810 of FIG. 8 or processor 905 or base station TDD LL module 910 of FIG. 9.

At block 1210, the device may identify a second TTI within the first TTI, the second TTI having a second TTI duration and configured for transmission in a second direction that is reverse from the first direction as described above with reference to FIGS. 2-4. In certain examples, the operations of block 1210 may be performed by the second TTI identification module 610 as described above with reference to FIG. 6. In some cases, the operations of block 1210 may be performed by the processor 805 or TDD LL module 810 of FIG. 8 or processor 905 or base station TDD LL module 910 of FIG. 9.

At block 1215, the device may communicate in the second direction during the second TTI as described above with reference to FIGS. 2-4. In certain examples, the operations of block 1215 may be performed by the transmitter 515 as described above with reference to FIG. 5. In some cases, the operations of block 1215 may be performed by the transceiver 835 of FIG. 8 or the transceiver 935 of FIG. 9.

At block 1220, the device may identify a first guard period between the second TTI and the third TTI, where the first guard period is within the first TTI as described above with reference to FIGS. 2-4. In certain examples, the operations of block 1220 may be performed by the guard period module 705 as described above with reference to FIG. 7. In some cases, the operations of block 1220 may be performed by the processor 805 or TDD LL module 810 of FIG. 8 or processor 905 or base station TDD LL module 910 of FIG. 9.

At block 1225, the device may identify a second guard period within the first TTI as described above with reference to FIGS. 2-4. In some cases, a sum of a duration of the first guard period and a duration of the second guard period is equal to the second TTI duration. In certain examples, the operations of block 1225 may be performed by the guard period module 705 as described above with reference to FIG. 7. In some cases, the operations of block 1225 may be performed by the processor 805 or base station TDD LL module 810 of FIG. 8 or processor 905 or base station TDD LL module 910 of FIG. 9.

Figure 13:
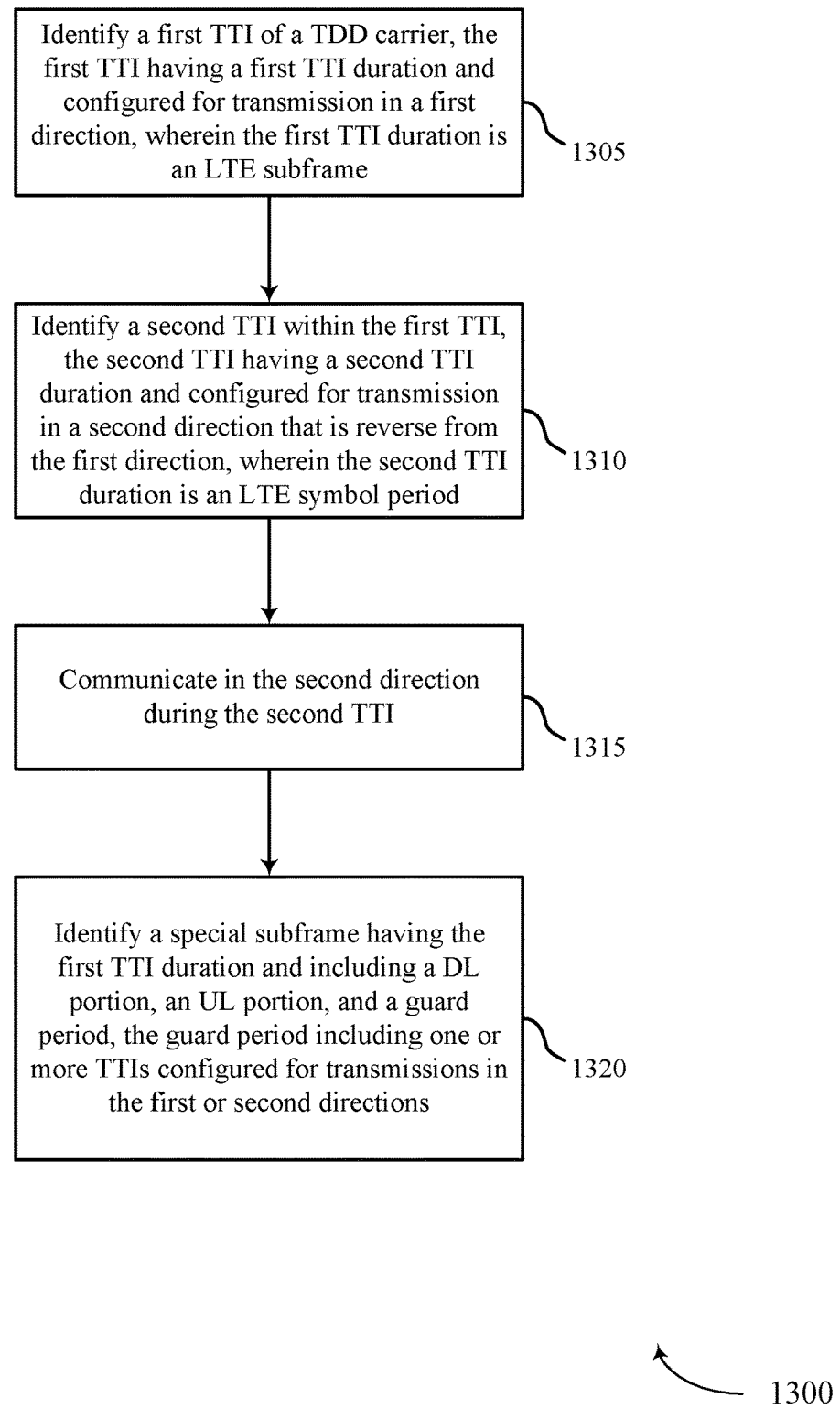
FIG. 13 illustrates a method for LL in TDD in accordance with various aspects of the present disclosure.

FIG. 13 shows a flowchart illustrating a method 1300 for LL in TDD in accordance with various aspects of the present disclosure. The operations of method 1300 may be implemented by a device such as a UE 115 or a base station 105 or its components as described with reference to FIGS. 1-9. For example, the operations of method 1300 may be performed by the TDD LL module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may identify a first TTI of a TDD carrier, the first TTI having a first TTI duration and configured for transmission in a first direction as described above with reference to FIGS. 2-4. In certain examples, the operations of block 1305 may be performed by the first TTI identification module 605 as described above with reference to FIG. 6. In some cases, the operations of block 1305 may be performed by the processor 805 or TDD LL module 810 of FIG. 8 or processor 905 or base station TDD LL module 910 of FIG. 9.

At block 1310, the device may identify a second TTI within the first TTI, the second TTI having a second TTI duration and configured for transmission in a second direction that is reverse from the first direction as described above with reference to FIGS. 2-4. In some cases, the first TTI duration is an LTE subframe and the second TTI duration is one LTE symbol period. In certain examples, the operations of block 1310 may be performed by the second TTI identification module 610 as described above with reference to FIG. 6. In some cases, the operations of block 1310 may be performed by the processor 805 or TDD LL module 810 of FIG. 8 or processor 905 or base station TDD LL module 910 of FIG. 9.

At block 1315, the device may communicate in the second direction during the second TTI as described above with reference to FIGS. 2-4. In certain examples, the operations of block 1315 may be performed by the transmitter 515 as described above with reference to FIG. 5. In some cases, the operations of block 1315 may be performed by the transceiver 835 of FIG. 8 or the transceiver 935 of FIG. 9.

At block 1320, the device may identify a special subframe having the first TTI duration and comprising a DL portion, an UL portion, and a guard period, the guard period comprising one or more TTIs configured for transmissions in the first or second directions as described above with reference to FIGS. 2-4. In certain examples, the operations of block 1320 may be performed by the PTS module 710 as described above with reference to FIG. 7. In some cases, the operations of block 1320 may be performed by the processor 805 or TDD LL module 810 of FIG. 8 or processor 905 or base station TDD LL module 910 of FIG. 9.

Figure 14:
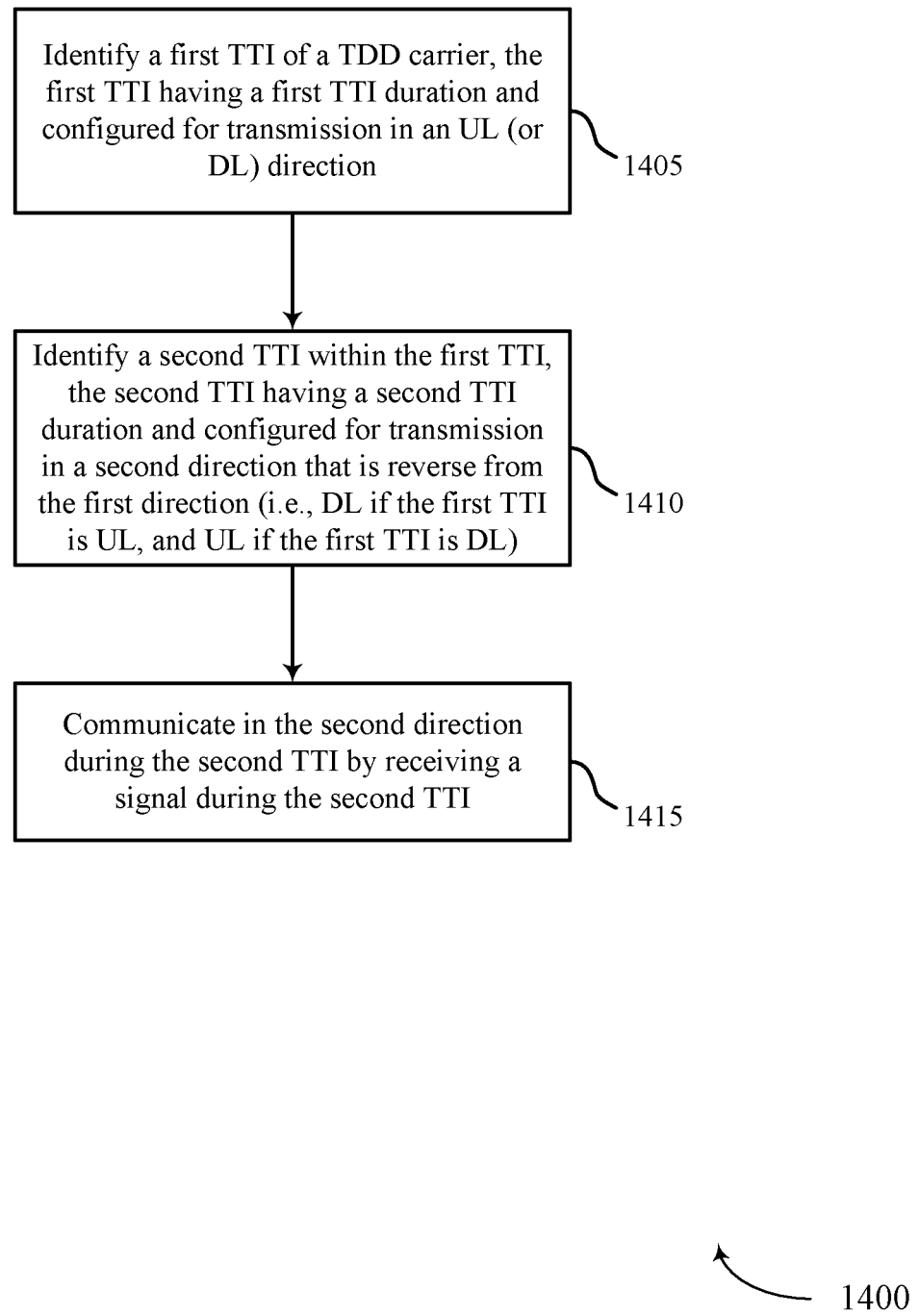
FIG. 14 illustrates a method for LL in TDD in accordance with various aspects of the present disclosure.

FIG. 14 shows a flowchart illustrating a method 1400 for LL in TDD in accordance with various aspects of the present disclosure. The operations of method 1400 may be implemented by a device such as a UE 115 or a base station 105 or its components as described with reference to FIGS. 1-9. For example, the operations of method 1400 may be performed by the TDD LL module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may identify a first TTI of a TDD carrier, the first TTI having a first TTI duration and configured for transmission in a first direction as described above with reference to FIGS. 2-4. In certain examples, the operations of block 1405 may be performed by the first TTI identification module 605 as described above with reference to FIG. 6. In some cases, the operations of block 1405 may be performed by the processor 805 or TDD LL module 810 of FIG. 8 or processor 905 or base station TDD LL module 910 of FIG. 9.

At block 1410, the device may identify a second TTI within the first TTI, the second TTI having a second TTI duration and configured for transmission in a second direction that is reverse from the first direction as described above with reference to FIGS. 2-4. In certain examples, the operations of block 1410 may be performed by the second TTI identification module 610 as described above with reference to FIG. 6. In some cases, the operations of block 1410 may be performed by the processor 805 or TDD LL module 810 of FIG. 8 or processor 905 or base station TDD LL module 910 of FIG. 9.

At block 1415, the device may communicate in the second direction during the second TTI as described above with reference to FIGS. 2-4. In some cases, the first direction is an UL direction and the second direction is a DL direction. In some cases, communicating includes: receiving a signal during the second TTI. In certain examples, the operations of block 1415 may be performed by the transmitter 515 as described above with reference to FIG. 5. In some cases, the operations of block 1415 may be performed by the transceiver 835 of FIG. 8 or the transceiver 935 of FIG. 9.

Figure 15:
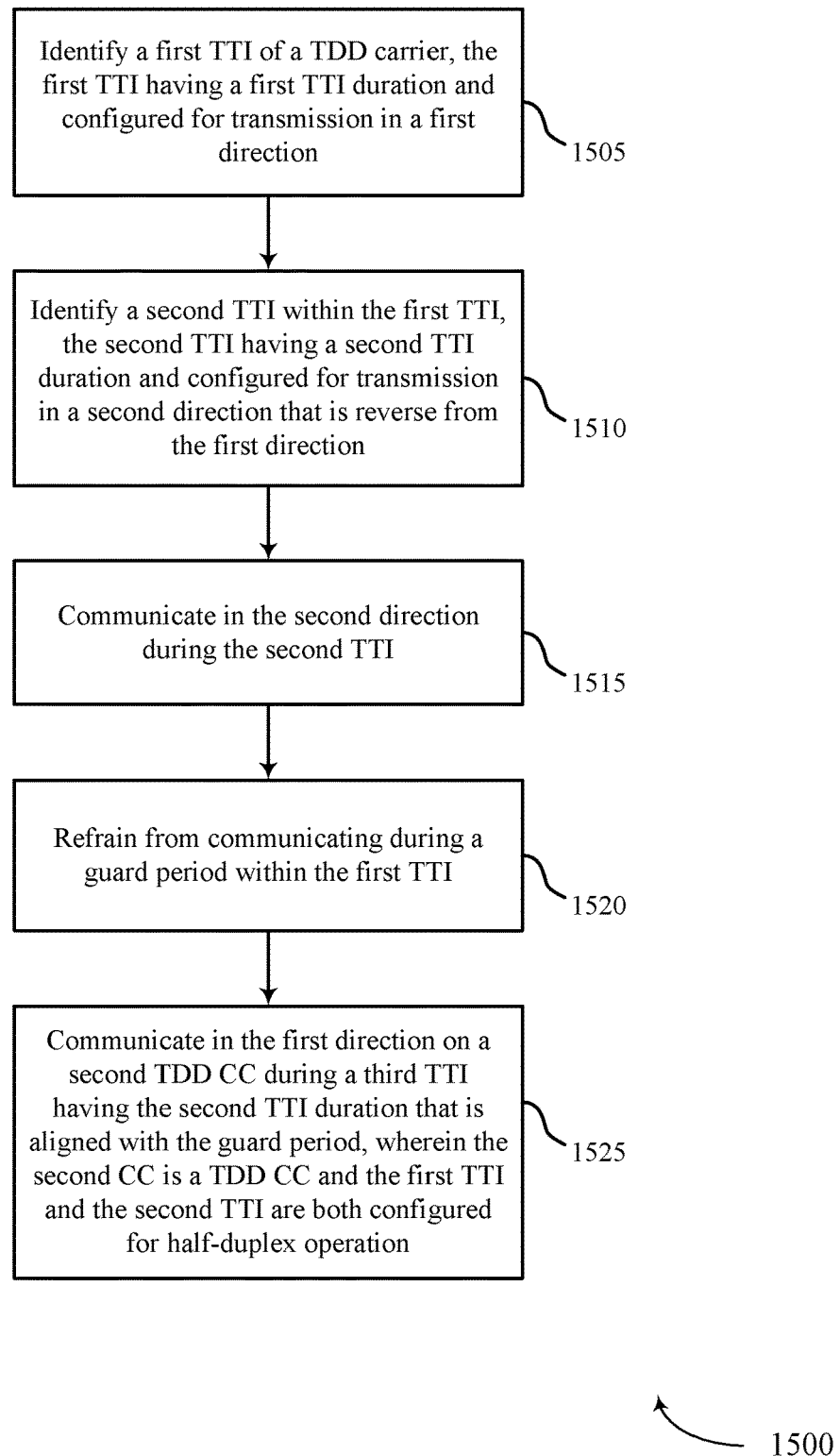
FIG. 15 illustrates a method for LL in TDD in accordance with various aspects of the present disclosure.

FIG. 15 shows a flowchart illustrating a method 1500 for LL in TDD in accordance with various aspects of the present disclosure. The operations of method 1500 may be implemented by a device such as a UE 115 or a base station 105 or its components as described with reference to FIGS. 1-9. For example, the operations of method 1500 may be performed by the TDD LL module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1500 may also incorporate aspects of methods 1000, 1100, 1200, 1300, and 1400 of FIGS. 10-14.

At block 1505, the device may identify a first TTI of a TDD carrier, the first TTI having a first TTI duration and configured for transmission in a first direction as described above with reference to FIGS. 2-4. In certain examples, the operations of block 1505 may be performed by the first TTI identification module 605 as described above with reference to FIG. 6. In some cases, the operations of block 1505 may be performed by the processor 805 or TDD LL module 810 of FIG. 8 or processor 905 or base station TDD LL module 910 of FIG. 9.

At block 1510, the device may identify a second TTI within the first TTI, the second TTI having a second TTI duration and configured for transmission in a second direction that is reverse from the first direction as described above with reference to FIGS. 2-4. In certain examples, the operations of block 1510 may be performed by the second TTI identification module 610 as described above with reference to FIG. 6. In some cases, the operations of block 1510 may be performed by the processor 805 or TDD LL module 810 of FIG. 8 or processor 905 or base station TDD LL module 910 of FIG. 9.

At block 1515, the device may communicate in the second direction during the second TTI as described above with reference to FIGS. 2-4. In some cases, the second CC is a TDD CC and the first TTI and the second TTI are both configured for half-duplex operation. In certain examples, the operations of block 1515 may be performed by the transmitter 515 as described above with reference to FIG. 5. In some cases, the operations of block 1515 may be performed by the transceiver 835 of FIG. 8 or the transceiver 935 of FIG. 9.

At block 1520, the device may refrain from communicating during a guard period within the first TTI as described above with reference to FIGS. 2-4. In certain examples, the operations of block 1520 may be performed by the guard period module 705 as described above with reference to FIG. 7. In some cases, the operations of block 1520 may be performed by the transceiver 835 of FIG. 8 or the transceiver 935 of FIG. 9.

At block 1525, the device may communicate in the first direction on the second TDD CC during a third TTI having the second TTI duration that is aligned with the guard period as described above with reference to FIGS. 2-4. In certain examples, the operations of block 1525 may be performed by the guard period module 705 as described above with reference to FIG. 7. In some cases, the operations of block 1525 may be performed by the transceiver 835 of FIG. 8 or the transceiver 935 of FIG. 9.

Thus, methods 1000, 1100, 1200, 1300, 1400, and 1500 may provide for LL in TDD. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes example configurations and does not represent all the examples that may be implemented or that are within the scope of the claims. The term "exemplary," as used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
    identifying, by a user equipment (UE), a first transmission time interval (TTI) of a time division duplex (TDD) carrier, the first TTI having a first TTI duration of a slot or a subframe and configured for uplink transmission;
    identifying a second TTI within the first TTI, the second TTI having a second TTI duration shorter than the first TTI duration and configured for downlink transmission of data or feedback; and
    receiving, by the UE, a signal from a base station during the second TTI.

2. The method of claim 1, further comprising:
    identifying a third TTI within the first TTI, wherein the third TTI is configured for uplink transmission.

3. The method of claim 2, further comprising:
    identifying a first guard period between the second TTI and the third TTI, wherein the first guard period is within the first TTI.

4. The method of claim 1, wherein identifying the first TTI or the second TTI comprises:
    receiving control signaling indicative of the first TTI or the second TTI.

5. The method of claim 1, wherein the first TTI duration comprises a Long Term Evolution (LTE) subframe and the second TTI duration comprises one or more LTE symbol periods.

6. The method of claim 1, further comprising:
    identifying a special subframe having the first TTI duration and comprising a downlink (DL) portion, an uplink (UL) portion, and a guard period, the guard period comprising one or more TTIs configured for uplink or downlink transmissions.

7. The method of claim 1, further comprising:
    transmitting data during the first TTI; and
    wherein the signal received during the second TTI comprises acknowledgement (ACK) or negative acknowledgment (NACK) feedback for the data transmitted during the first TTI.

8. The method of claim 1, wherein identifying the second TTI comprises at least one of:
    determining that the first TTI is not scheduled for a system information block 1 (SIB1) transmission;

determining that the second TTI is not scheduled for a cell-specific reference signals (CRS) transmission; or determining that the second TTI is not scheduled in a resource block reserved for at least one of a physical broadcast channel, a synchronization channel, or a common search space.

9. The method of claim 1, wherein the TDD carrier is a component carrier (CC) of a plurality of CCs configured for carrier aggregation (CA) operation, the plurality of CCs comprising a second CC.

10. The method of claim 9, wherein the second CC is a TDD CC and the first TTI and the second TTI are both configured for half-duplex operation.

11. The method of claim 9, wherein the TDD carrier and the second CC are TDD CCs, and the TDD carrier and the second CC have a complementary transmission configuration for a frame, wherein the complementary transmission configuration comprises TTIs configured for uplink transmission in substantially every subframe of the frame, and at least one TTI configured for downlink transmission.

12. The method of claim 11, wherein the complementary transmission configuration comprises an offset frame structure for the TDD carrier and the second CC.

13. The method of claim 9, wherein the plurality of CCs configured for CA operation further comprises a third CC having a frame comprising TTIs of the first TTI duration each configured for uplink or downlink transmission.

14. The method of claim 9, wherein the second TTI is configured for downlink transmission on the TDD carrier in a first time period, and is configured for downlink transmission on the second CC in a second time period.

15. An apparatus for wireless communication, comprising:
means for identifying, by a user equipment (UE), a first transmission time interval (TTI) of a time division duplex (TDD) carrier, the first TTI having a first TTI duration of a slot or a subframe and configured for uplink transmission;
means for identifying a second TTI within the first TTI, the second TTI having a second TTI duration shorter than the first TTI duration and configured for downlink transmission of data or feedback; and
means for receiving, by the UE, a signal from a base station during the second TTI.

16. An apparatus for wireless communication, comprising:
a processor;
memory in electronic communication with the processor; and
instructions stored in the memory, wherein the instructions are executable by the processor to cause the apparatus to:
identify, by a user equipment (UE), a first transmission time interval (TTI) of a time division duplex (TDD) carrier, the first TTI having a first TTI duration of a slot or a subframe and configured for uplink transmission;
identify a second TTI within the first TTI, the second TTI having a second TTI duration shorter than the first TTI duration and configured for downlink transmission of data or feedback; and
receive, by the UE, a signal from a base station during the second TTI.

17. The apparatus of claim 16, wherein the instructions are executable by the processor to cause the apparatus to:
identify a third TTI within the first TTI, wherein the third TTI is configured for uplink transmission.

18. The apparatus of claim 17, wherein the instructions are executable by the processor to cause the apparatus to:
identify a first guard period between the second TTI and the third TTI, wherein the first guard period is within the first TTI.

19. The apparatus of claim 16, wherein the instructions are executable to cause the apparatus to:
receive control signaling indicative of at least one TTI.

20. The apparatus of claim 16, wherein the first TTI duration comprises a Long Term Evolution (LTE) subframe and the second TTI duration comprises one or more LTE symbol periods.

21. The apparatus of claim 20, wherein the instructions are executable by the processor to cause the apparatus to:
identify a special subframe having the first TTI duration and comprising a downlink (DL) portion, an uplink (UL) portion, and a guard period, the guard period comprising one or more TTIs configured for uplink or downlink transmissions.

22. The apparatus of claim 16, wherein the instructions are executable by the processor to cause the apparatus to:
transmit data during the first TTI; and
wherein the signal received during the second TTI comprises acknowledgement (ACK) or negative acknowledgment (NACK) feedback for data transmitted during the first TTI.

23. The apparatus of claim 16, wherein the instructions are executable by the processor to cause the apparatus to:
determine that the first TTI is not scheduled for a system information block 1 (SIB1) transmission;
determine that the second TTI is not scheduled for a cell-specific reference signals (CRS) transmission; or
determine that the second TTI is not scheduled in a resource block reserved for at least one of a physical broadcast channel, a synchronization channel, or a common search space.

24. The apparatus of claim 16, wherein the TDD carrier is a component carrier (CC) of a plurality of CCs configured for carrier aggregation (CA) operation, the plurality of CCs comprising a second CC.

25. The apparatus of claim 24, wherein the second CC is a TDD CC and the first TTI and the second TTI are both configured for half-duplex operation.

26. The apparatus of claim 24, wherein the TDD carrier and the second CC are TDD CCs, and the TDD carrier and the second CC have a complementary transmission configuration for a frame, wherein the complementary transmission configuration comprises TTIs configured for uplink transmission in substantially every subframe of the frame, and at least one TTI configured for downlink transmission.

27. The apparatus of claim 26, wherein the complementary transmission configuration comprises an offset frame structure for the TDD carrier and the second CC.

28. A non-transitory computer-readable medium storing code for wireless communication, the code comprising instructions executable to:
identify, by a user equipment (UE), a first transmission time interval (TTI) of a time division duplex (TDD) carrier, the first TTI having a first TTI duration of a slot or a subframe and configured for uplink transmission;
identify a second TTI within the first TTI, the second TTI having a second TTI duration shorter than the first TTI duration and configured for downlink transmission of data or feedback; and receive, by the UE, a signal from a base station during the second TTI.

\* \* \* \* \*